DATA HANDLING APPARATUS

Filed June 1, 1965 12 Sheets-Sheet 1

INVENTORS
*Richmond D. Belcher, Robert J. Duggan,*
*George R. Ellis, Robert H. Esslinger,*
*William Frederick Goodyear, Joseph C. Marshall, Thomas R. Masone*

March 10, 1970 R. D. BELCHER ET AL 3,500,327

DATA HANDLING APPARATUS

Filed June 1, 1965 12 Sheets-Sheet 9

March 10, 1970 R. D. BELCHER ET AL 3,500,327

DATA HANDLING APPARATUS

Filed June 1, 1965 12 Sheets-Sheet 12

3,500,327

DATA HANDLING APPARATUS

Richmond D. Belcher, Thornwood, and Robert J. Duggan, Bronx, N.Y., and George R. Ellis, Trumbull, Robert H. Esslinger, Wilton, and William Frederick Goodyear, Westport, Conn., Joseph C. Marshall, Chappaqua, N.Y., and Thomas R. Masone, Stamford, Conn., assignors to The Bunker-Ramo Corporation, Stamford, Conn., a corporation of Delaware Continuation-in-part of application Ser. No. 370,323, May 26, 1964. This application June 1, 1965, Ser. No. 460,117
Int. Cl. H04q 1/18
U.S. Cl. 340—154 13 Claims

ABSTRACT OF THE DISCLOSURE

A system for receiving queries from data entry means at a plurality of remote stations and for sending replies from a central station having data storage and data processing means to the appropriate remote station to be displayed on a data presentation means such as a cathode ray tube. The queries at the remote stations are interrogated by circuitry at an intermediate station. A recirculating memory means is provided at the intermediate station for assembling the query messages. A complete query is transmited from the intermediate station to the central station where a reply message corresponding to the query is developed. The reply is transmitted back to the intermediate station and stored in a recirculating memory. The reply message is periodically sent as a succession of signals to the appropriate remote station to control the display on the data presentation means. Periodically, the central station interrogates all queries stored at the intermediate station, including those for which replies have previously been generated, and generates new replies in response to these queries. The information display at the remote station is in this manner maintained current.

This application is a continuation-in-part of our copending application, Ser. No. 370,323, filed May 26, 1964, now abandoned.

This invention relates to high-speed data processing systems of the type including a central data processor adapted to operate with a plurality of remote input/output units. In such systems, the remote units typically include means for sending query messages to the processor and for displaying the reply data, e.g. in the form of alphabetic and numeric symbols. As an illustrative embodiment of the invention, there is described hereinbelow a stock quotation system adapted to provide stock brokers with nearly instantaneous replies to individual queries concerning stock transactions on the major exchanges in the country.

As is well known, a large variety of systems and apparatus have been proposed and used, over the years, to provide stock brokers and their customers with prompt up-to-date information concerning securities transactions. One prominent mode of displaying stock quotation information is the so-called stock quotation board which contains a large number of remotely settable indicating devices arranged to present a continuously up-dated display of price information for a selected group of stocks. Frequently associated with such a quotation board is a projection screen upon which is cast a moving display of the stock data as it is received over the stock ticker lines. In another form of stock quotation service, the broker is provided with a special telephone set having a conventional dial by means of which a code signal can be generated corresponding to a selected stock. The system thereupon will produce in the ear piece of the telephone a voice reply giving the latest price information on the selected stock. Such a system is disclosed in U.S. Patent No. 3,133,268, issued to Avakian et al. on May 12, 1964.

Also available are a number of different types of broker's desk units adapted to furnish the broker and his customer with a graphic display of price information for any stock selected by manipulation of manual controls provided on the desk unit. Although some of these broker's desk units have performed useful functions, they have not been fully satisfactory for a variety of reasons. Thus there has existed a need for a system with improved capabilities, including greater flexibility as well as higher speed in handling and presenting large amounts of information.

Accordingly, it is an object of the present invention to provide data handling apparatus which is superior to that available heretofore.

Another object of this invention is to provide high-speed data processing apparatus adapted to furnish rapid query-and-reply service with flexibility and reliability.

Yet another object of this invention is to provide improved apparatus for displaying reply data.

A further object of the present invention is to provide an improved query-and-reply system.

A still further object of the present invention is to provide an improved sampling means for sequentially selecting and energizing a plurality of input query devices of a query-and-reply system.

Still another object of the present invention is to provide, in a query-and-reply system including a plurality of input query devices and associated output reply display devices, an improved sampling means sequentially energizing selected ones of the input query devices and supply reply data to corresponding ones of the output devices.

A better understanding of this invention may be had from the following detailed description when read in connection with the accompanying drawings, in which.

Figure 9A:
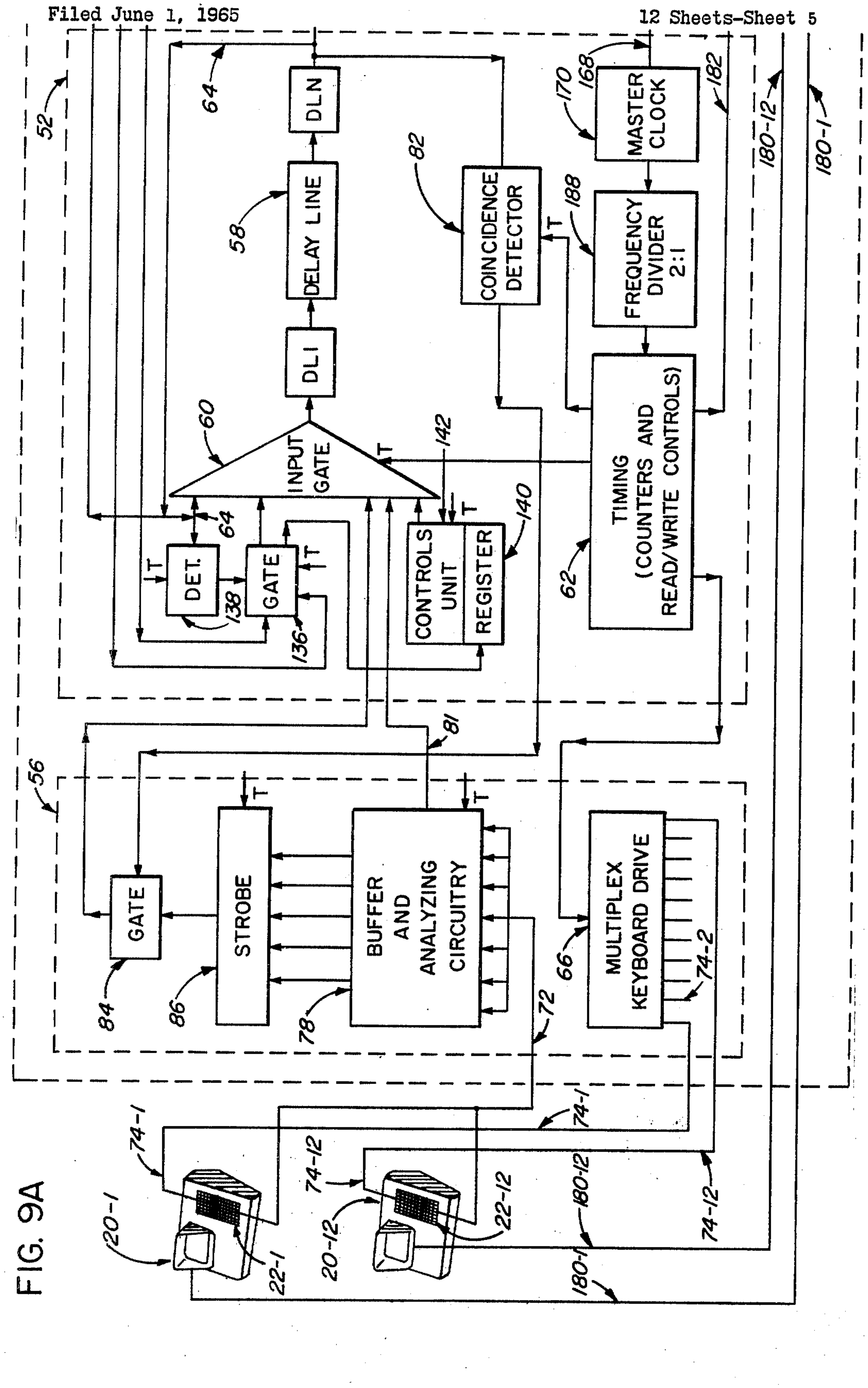
Figure 9B:
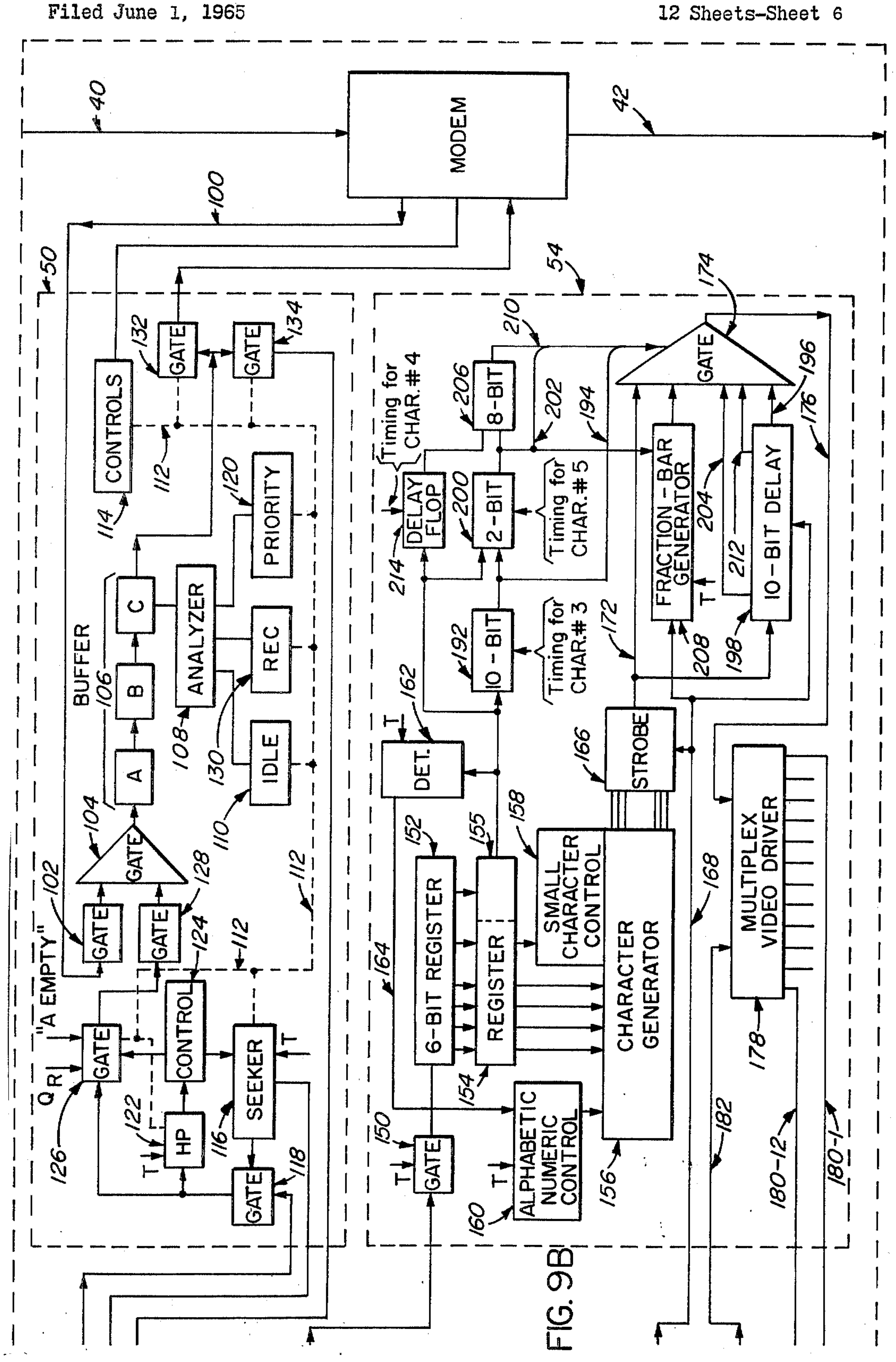
Figure 10A:
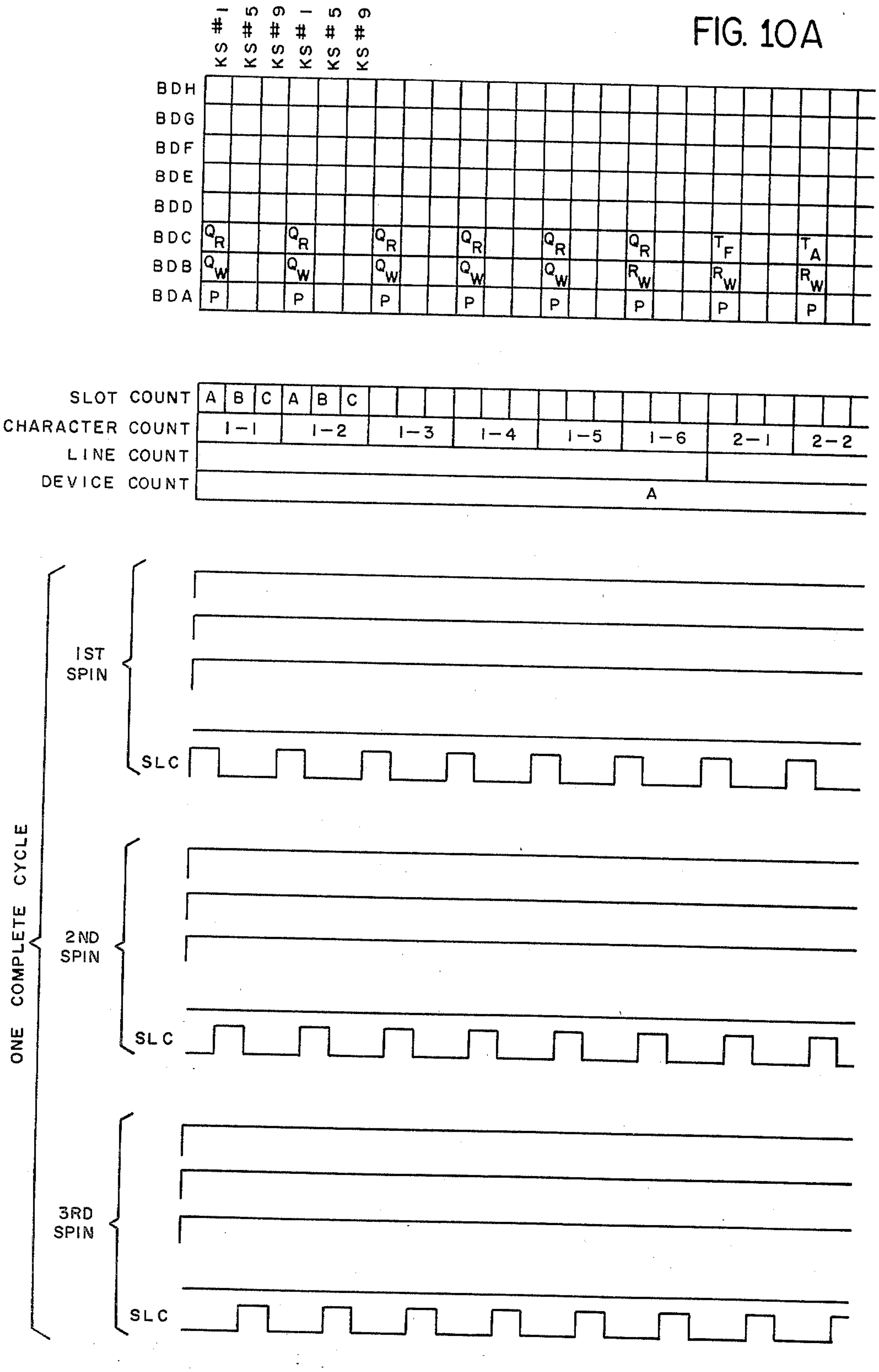
Figure 10B:
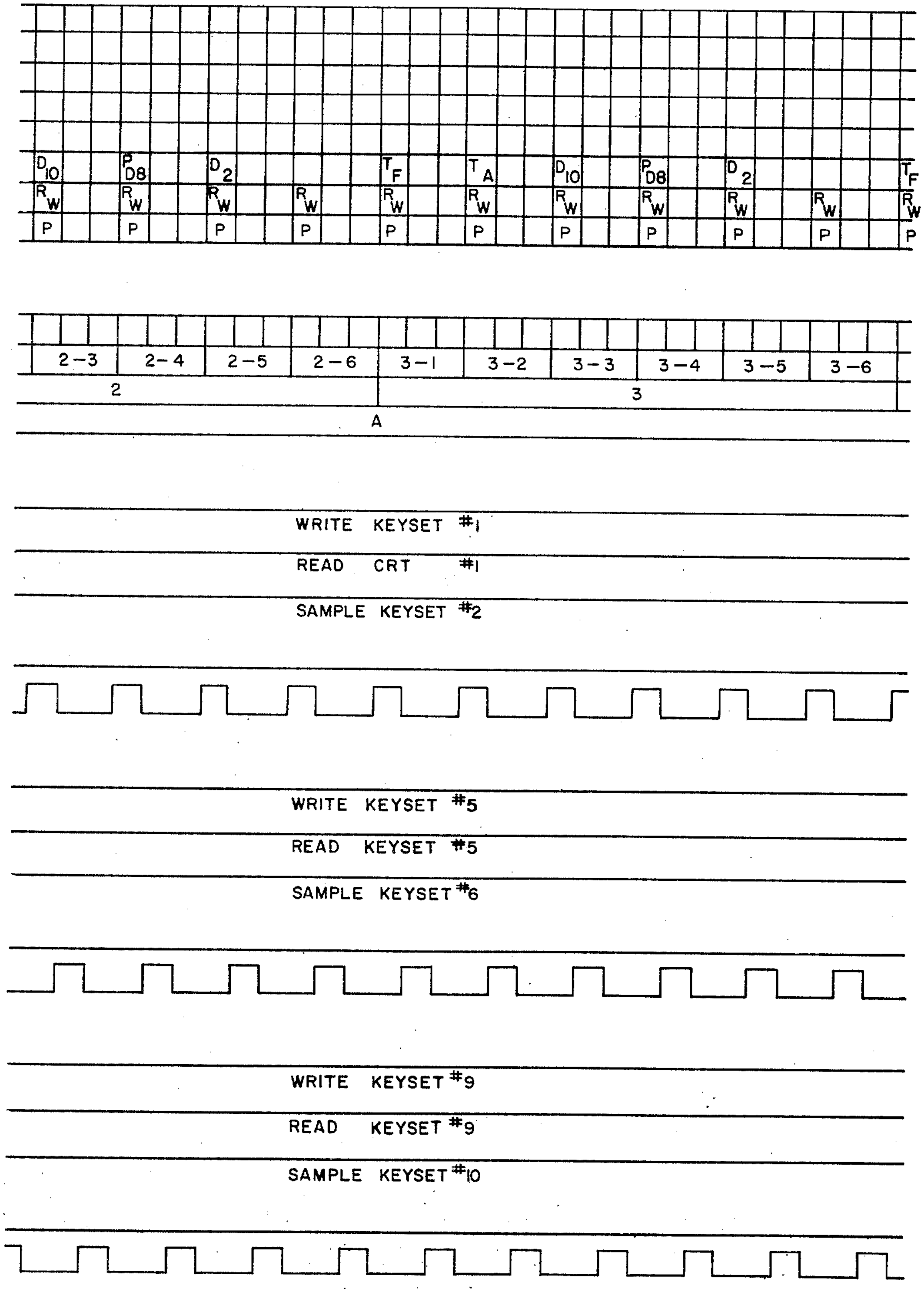
Figure 10C:
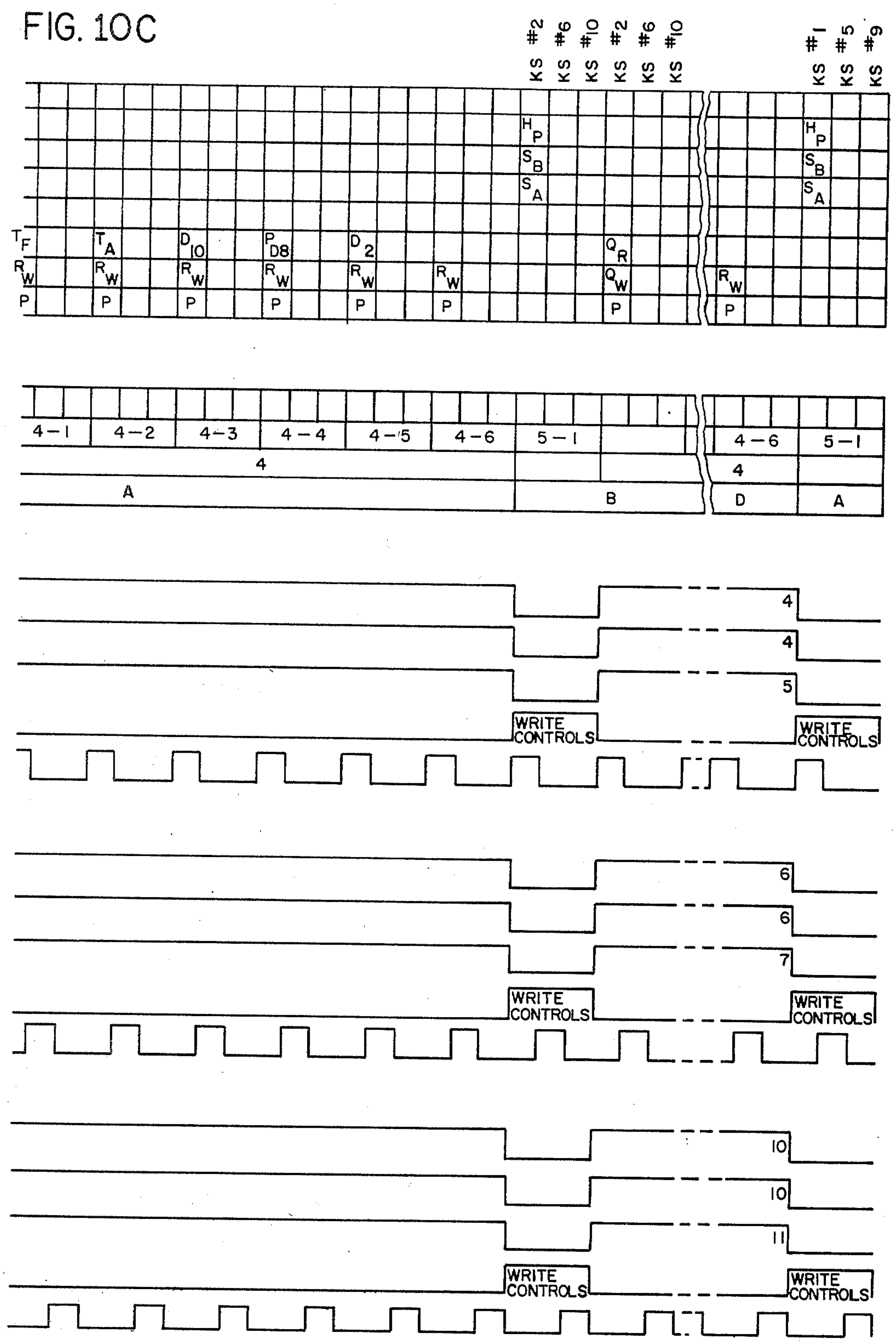
Figure 11:
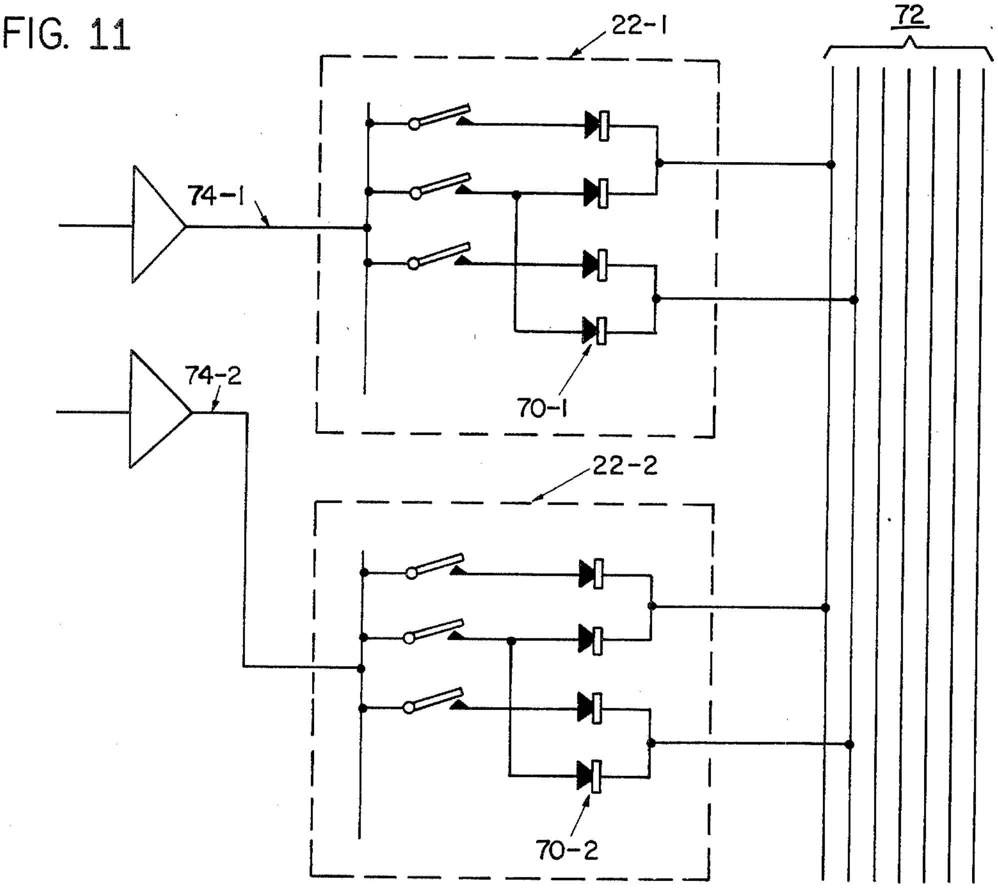
Figure 12:
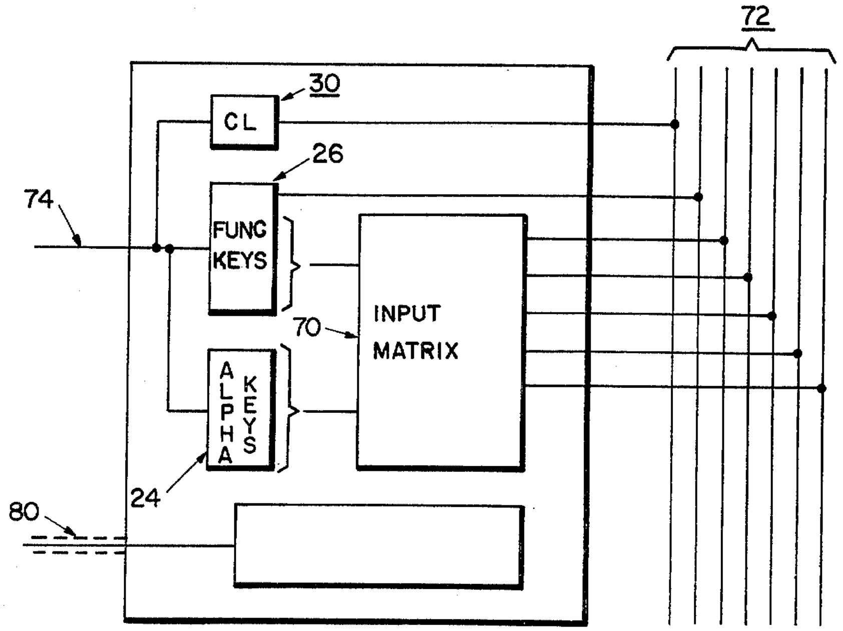
Figure 13A:
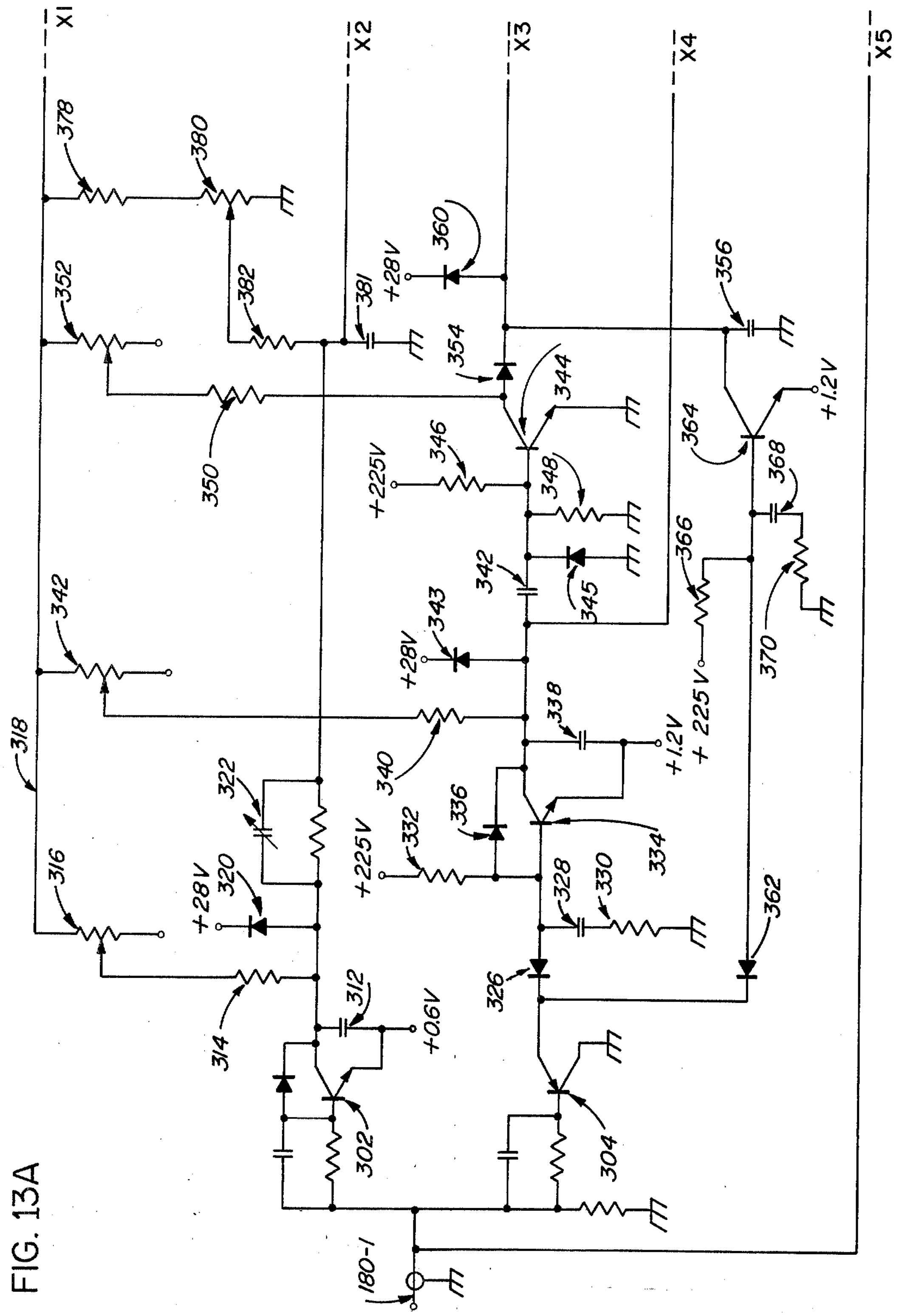
Figure 13B:
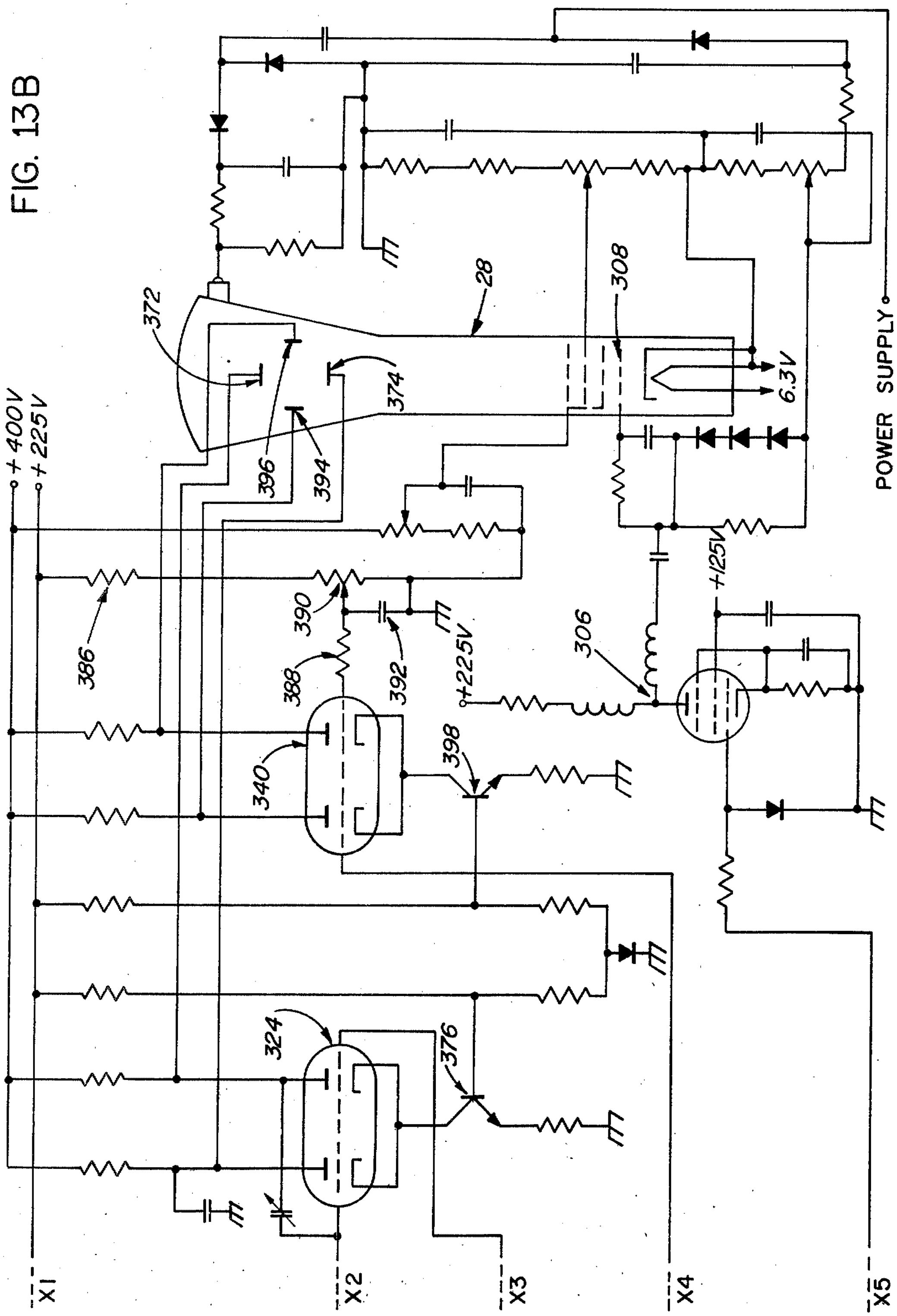

FIGURES 9A and 9B together present a block diagram showing the basic components of the stock quotation system;

FIGURES 10A, 10B and 10C comprise a schematic diagram including a mapped representation of the manner in which the data is arranged in the delay line storage device, together with timing diagrams showing the sequencing of the basic data reading and writing operations;

FIGURE 11 is a schematic diagram showing aspects of the keyboard sampling circuitry;

FIGURE 12 is a block diagram illustrating the connections for the different classes of keys of the keyboard; and FIGURES 13A and 13B together comprise a schematic diagram of a preferred circuit for controlling the cathode ray tube display device.

Figure 1:
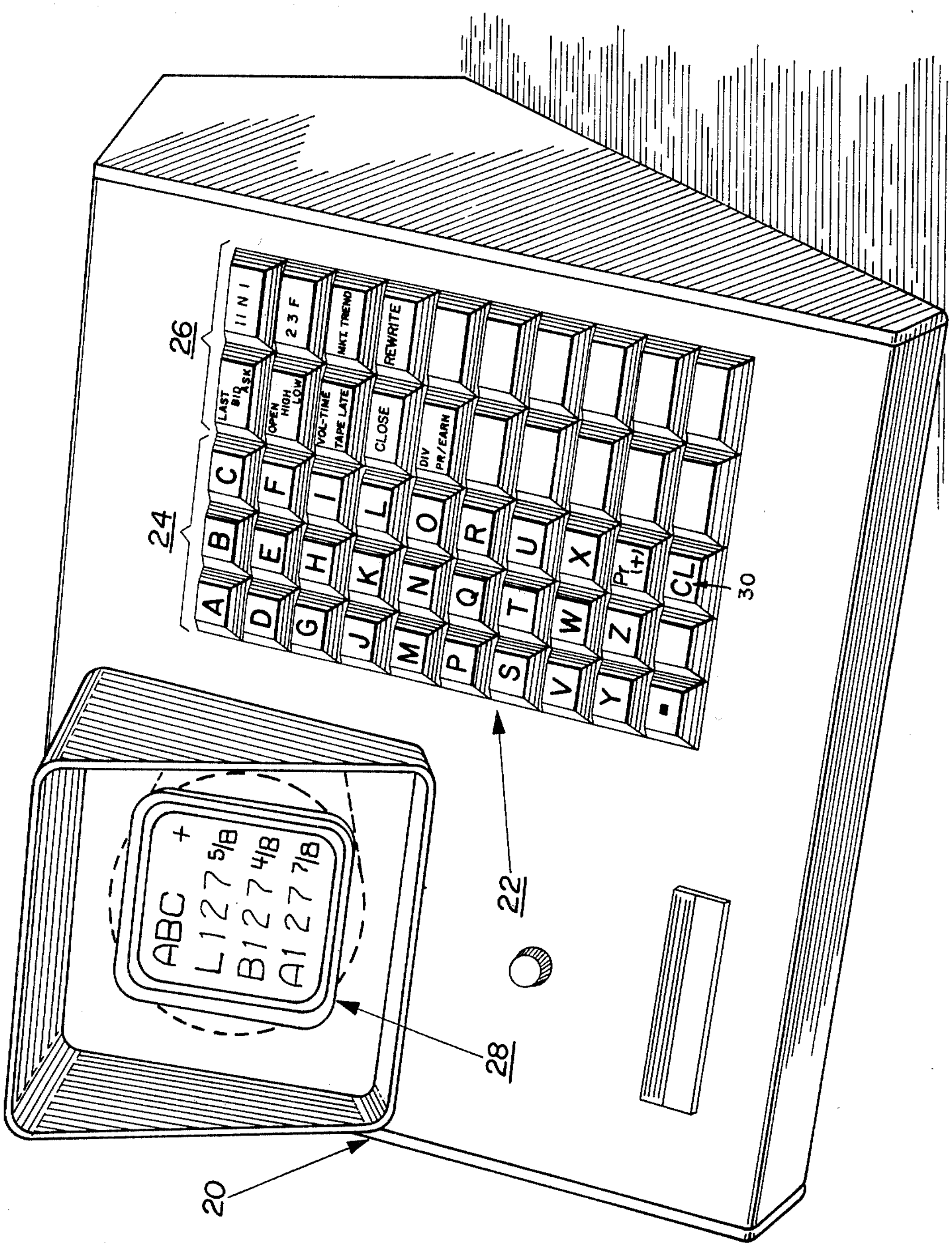
FIGURE 1 is a perspective view of a broker's desk unit incorporating a cathode ray tube for presenting alphabetic and numeric symbols.

Referring now to FIGURE 1, there is shown a broker's desk unit 20 comprising a keyset having a manually-operable keyboard generally indicated at 22. The three columns of alphabetic keys 24 on the left side are referred to herein as "stock identification" keys and provide means by which the broker can indicate any desired stock by depressing keys corresponding to the established code for that stock. For example, to enter a query concerning the stock of The Teleregister Corporation, the broker would press keys TC in sequence.

To the right of the stock identification keys 24 are two additional columns of keys referred to herein as "function" keys, and which control the nature of the information to be developed. For example, depressing the key identified as "Last, Bid, Ask" will produce a query message calling for a reply message giving the latest sale price, and the current bid and asked prices, for any stock previously identified by keys 24. The remaining function keys provide a variety of useful and commonly desired information sets concerning the selected stock, as indicated in FIGURE 1 on the faces of the keys.

The desk unit 20 also includes a CRT (cathode ray tube) display means 28 adapted to visually present both the query-and-reply messages, in alphabetic or numeric form, or in special symbolic configuration, as required. This CRT display means provides a fixed format display of four lines, each having up to six characters. Thus the CRT display means can accommodate up to 24 characters.

As the first stock identification key 24 is pressed, the corresponding alphabetic symbol appears in the upper left-hand corner of the CRT display means 28. Successive stock identification letters appear in sequential order in the top line, up to a total of five. Subsequent depression of a selected function key 26 will cause one letter identifying that function to appear in the first position of line 2, e.g. the letter "L" will appear in this position if the function key "Last, Bid, Ask" is pressed. Almost immediately thereafter, the data processing system (to be described hereinbelow) develops the required reply data and completes the CRT display by filling in the stock price data and the remainder of the function letters, e.g. "B" and "A" in lines 3 and 4.

A different set of data for the same selected stock may be obtained simply by depressing another function key 26. For example, if the stock is displayed with "Last, Bid, Ask" data, the "Open, High, Low" data for the same stock will be displayed substantially upon the appropriate function key being depressed. If data on a different stock is desired, that stock must first be entered via the stock identification keys 24, and a following function key 26 must be depressed. When the key for the first letter of the new stock is depressed, all of the data previously displayed on the display means will be wiped clear and the new letter will be inserted in the first position of the top line. The remainder of the new stock query will be handled as before.

The sixth position of the top line is reserved for special information concerning the selected stock. For example, for certain stocks, a "plus" sign or a "minus" sign will be displayed in this position to indicate that the trend of the stock price is up or down, respectively. A "Clear" key 30 also is provided to permit the broker to wipe off the entire display whenever desired.

Figure 2:
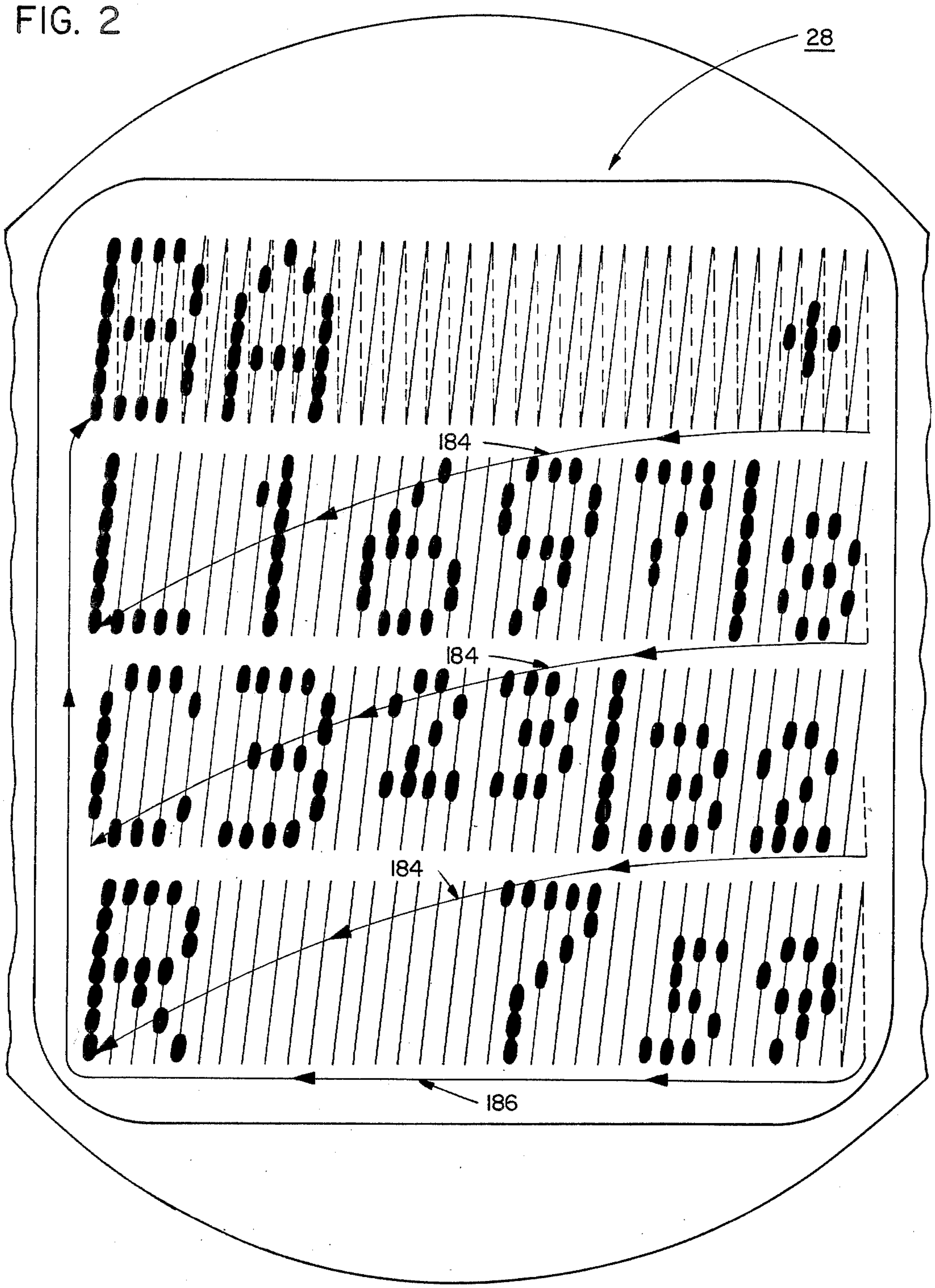
FIGURE 2 is an enlarged view showing diagrammatically the manner in which the alphabetic and numeric symbols are generated on the face of the cathode ray tube.

Referring now to FIGURE 2, the electron beam of the cathode ray tube 28 is deflected in a manner to produce a distinctive raster pattern. As noted, the format of the data display is in the form of four lines of characters, each line including up to six characters. The raster pattern developed on the face of the CRT is in the form of four parallel rasters extending transversely of the face of the tube. Each of the four rasters is of a height commensurate with the height of the characters as set forth above. The beam of the CRT is deflected to produce a generally sawtooth trace across the face of the tube for each of the four rasters, the "up" strokes being the data strokes and the "down" strokes being the retrace strokes. At the end of the first, second and third lines, the beam is deflected to the beginning of the next subsequent line. At the end of the fourth line, the beam is deflected to the beginning of the first line. The circuitry for accomplishing this raster pattern will be discussed hereinafter in connection with FIGURES 13A and 13B.

In operation, both the "up" and "down" strokes of the trace are normally blanked such that no visible trace appears on the face of the tube. The characters are caused to appear on the tube face by selectively energizing predetermined portions of certain ones of the "up" strokes. To this end, each "up" stroke may be considered as being divided into seven successive segments or elements. Since each element occupies a precise time poistion along the stroke of the beam, the beam may be intensified by appropriate signal means to cause a visible spot to appear on the face of the tube at selected ones of the elements or segments of the selected "up" strokes. In the illustrative format, five adjacent "up" strokes define the area within which each character is formed. Thus, each character is formed in what appears as a 5 x 7 dot matrix. Between each of the five-stroke groups, which define the area within each character is formed, there is an additional "up" stroke. This additional "up" stroke is, with one exception to be hereinafter discussed, left in its blanked condition to establish a space between adjacent characters. As indicated in the upper left-hand corner of FIGURE 2, the letter B, by way of example, is generated by intensifying all seven elements of the 1st sweep or "up" stroke, the first, fourth and seventh elements of sweeps 2–4 and the second, third, fifth and sixth elements of the 5th sweep.

For the purpose of displaying fractions (or decimals, minutes, etc.), special means are provided to form the characters by a code which intensifies only elements located in a truncated portion of the basic character region, as indicated in lines 2–4 of FIGURE 2. In the present embodiment, this portion includes only four of the five available vertical sweeps, and only five of the available seven intensifiable elements of each "up" stroke. In other words, a 4 x 5 element matrix is selected from within the basic 5 x 7 element matrix, and in this smaller matrix a correspondingly smaller character is outlined for the required special purposes. It may be noted that the smaller 4 x 5 area is substantially "similar" to the basic 5 x 7 area, i.e. the ratio of the length of the short and long sides is approximately the same and the angles are the same, so that the configuration of the smaller characters is like that of the larger characters. When these smaller characters are used to display fractions, the fraction line between the numerator and denominator is generated by brightening all seven elements of the normally blank "up" stroke between characters.

Figure 3:
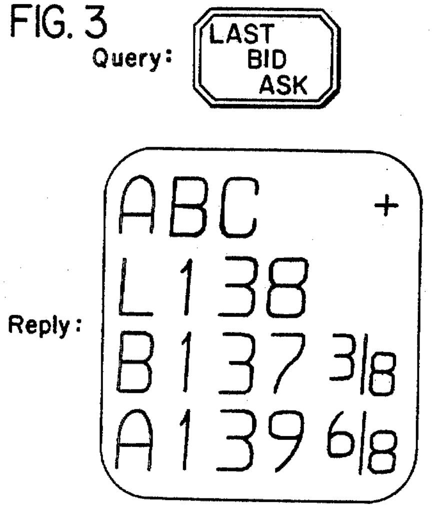
FIGURES 3 through 7 show various query and reply formats.
Figure 4:
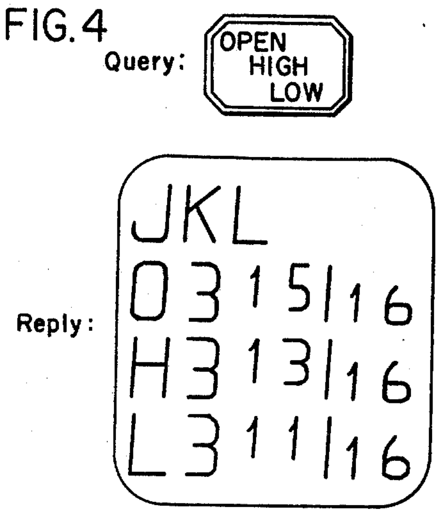
Figure 5:
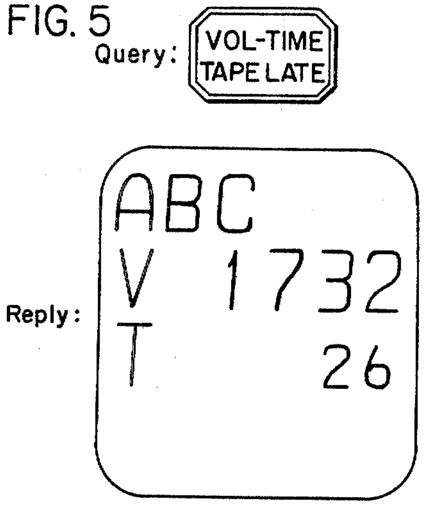
Figure 6:
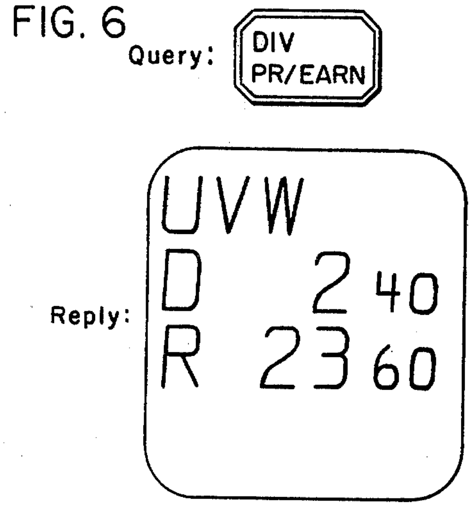
Figure 7:
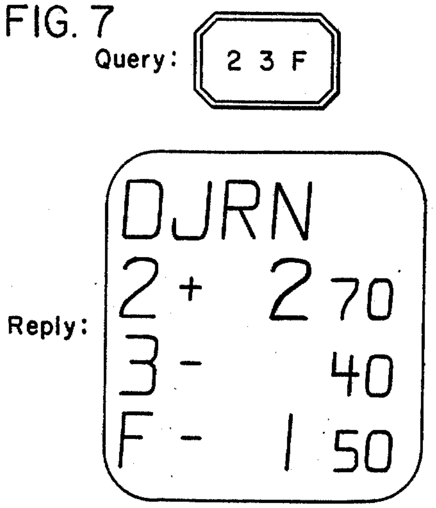

FIGURES 3 through 7 show specific examples of the query-and-reply formats which result from actuating certain of the function keys 26. FIGURES 3 and 4 illustrate the Last, Bid, Asked and Open, High, Low queries referred to above, and particularly show replies including fractional eighths and sixteenths respectively. FIGURE 5 shows the display format for the Volume-Time function, indicating today's cumulative volume of the stock sold, and time since the last sale in hours and minutes; this same function key can be used to show the number of hours and minutes the tape is late, by first entering TKR in the keys 24. FIGURE 6 shows the display format for Dividends and the Price-Earnings Ratio. FIGURE 7 illustrates a presentation of the Dow-Jones Rails index at 2 p.m., 3 p.m. and Final, showing the amount by which this index is either up or down as indicated by the plus and minus signs.

Figure 8:
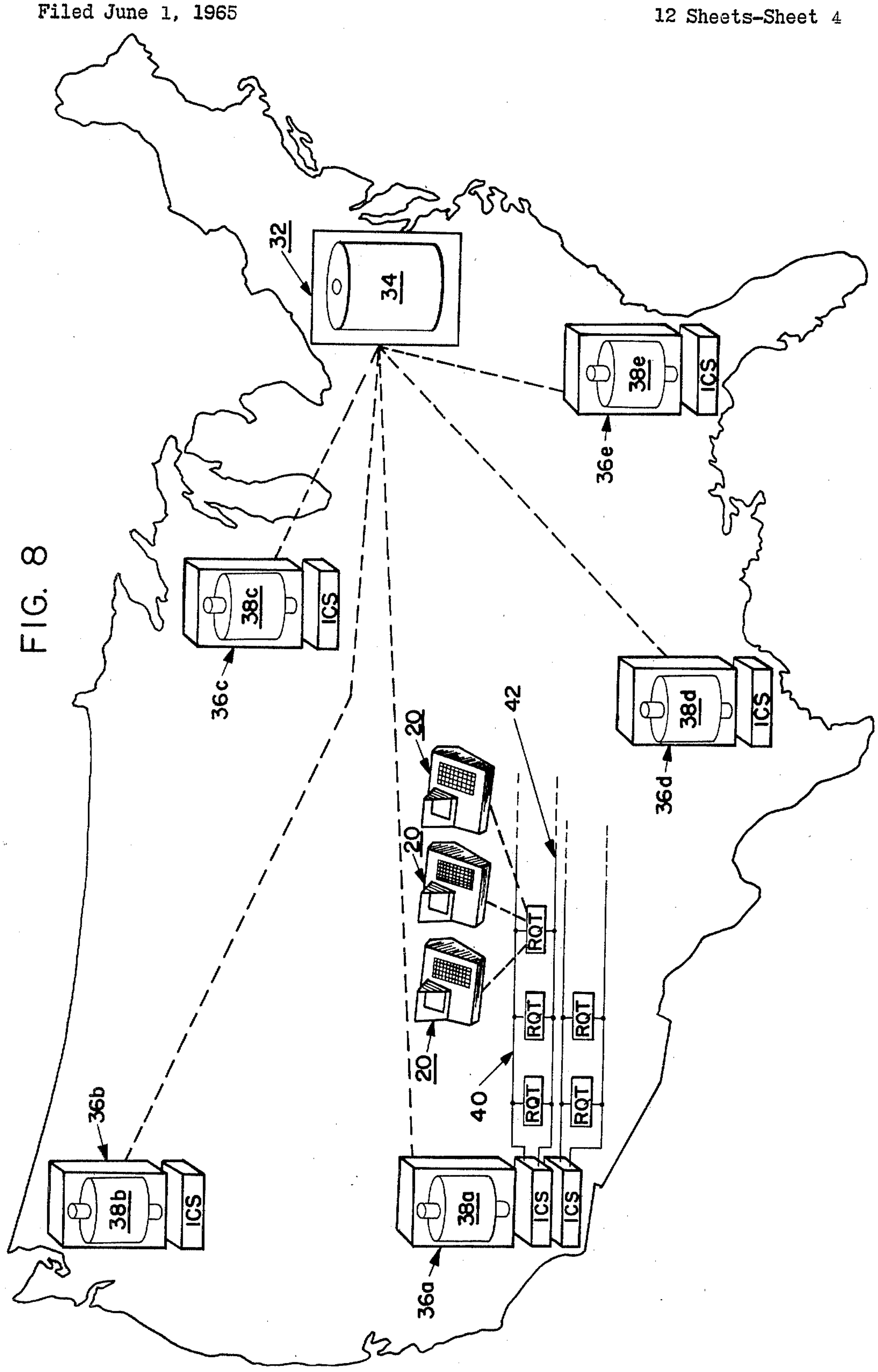
FIGURE 8 is a diagrammatic showing of a nation-wide network for a stock quotation system including apparatus in accordance with the present invention.

Refering now to FIGURE 8, the basic stock transaction data is obtained from the usual "ticker lines" (not shown) emanating from the major stock exchanges in the country, such as the New York Stock Exchange, The American Stock Exchange, etc. This ticker line data is fed to a high-speed computer at a computer center, generally indicated at 32, which includes a large capacity data storage means such as one or more rotating drums 34 on which the stock transaction details (price, number of shares, etc.)

are calculated and recorded in accordance with predetermined computational programs. A computer suitable for this purpose is the computer known by the name "telefile" and produced by The Teleregister Corporation (now The Bunker-Ramo Corp.).

At various locations throughout the country are a number of so-called satellite stations 36*a*, 36*b*, etc., connected to the computer center 32 by suitable two-way telephone-type transmission lines indicated by interrupted lines in FIGURE 8. Each of these satellite stations includes a rapidly-accessible data storage device such as a magnetic drum 38*a*, 38*b*, etc., carrying stock transaction data controlled by the computer center 32. For example, the data may include the latest prices at which all of the various stocks and/or other securities have been traded on the various exchanges throughout the country, the bid and asked prices for these securities, the previous day's high and low prices, etc. In general, much of the information stored at the computer center 32 will be repeated at the satellite stations, although certain items of only limited interest to the public at large will be retained only at the computer center. The most common event of general interest is the sale of stock, and when this is reported via the ticker line to the computer, the details of the transaction are recorded on the large drum 34. If the sale was at a price different from the previously recorded last price for that stock, the computer will immediately update the data stored on the drums 38*a*, etc., to provide the satellites with the most up-to-date information.

Forming part of each satellite station 36*a*, etc., is one or more auxiliary equipments titled "Interrogation Control Sub-System" and referred to hereinafter simply as ICS for the sake of brevity. Each ICS is connected over a conventional communication line, providing two signal paths 40 and 42 operating in a half-duplex mode, to a plurality of devices each titled "Remote Query Transceiver" and refered to hereinafter as RQT. Each RQT unit typically will be located in a stock broker's office and, as indicated in the lower left-hand corner of FIGURE 8, will serve a plurality of broker's CRT desk units 20, etc., for example, up to a total of twelve such desk units in the embodiment to be described herein.

Referring now to FIGURES 9*a* and 9*b*, which together form a block diagram of one RQT and twelve associated broker's desk units 20, it will be seen that each RQT comprises four principal elements each surrounded in the drawing by an interrupted block and identified as:

(1) Communications Equipment 50 connecting the RQT to the transmission lines 40 and 42;
(2) Central Storage Teming Equipment 52;
(3) CRT Control Equipment 54; and
(4) Keyboard Sampling Equipment 56.

The Central Storage and Timing Equipment 52 includes a magnetostrictive delay line 58 of conventional and commercially available construction which serves as a cyclical recirculating binary storage device, or memory, substantially in the manner generally described in copending application Ser. No. 307,190, filed Sept. 6, 1963, by Windels et al. There are, however, significant differences in the mode of operation. The binary input to the delay line memory is effected by a driver flop DLI controlled by an input gate 60. This gate, in turn, is activated by timing signals from the Counters and Read/Write Controls 62 so as selectively to supply the delay line with binary bits from various signal sources as will be described.

The output of the delay line memory 58, from the isolation flop DLN, is connected through a feedback line 64 to the input gate 60 to permit continuous recirculation of data. If the system is idling, i.e. no queries being entered by the keysets 22 or being serviced by other parts of the system, gate 60 will maintain this feedback circuit closed and thus there will be no change in the data stored in the delay line memory. However, as will be explained in more detail, when a broker enters a stock query by depressing keys of the keyboard 22, corresponding characters are entered into the delay line through gate 60 and override the feedback signals. Corresponding characters appear on the CRT display substantially immediately upon their entry into the delay line memory. Upon the completion of such a query message, a sequence of events is initiated to develop a reply message from the satellite station 36*a* (FIG. 8), insert such reply message into the delay line memory through the gate 60 in the form of appropriate coded signals representing data characters, and generate alphanumeric (or other) symbols on the CRT of the querying desk unit corresponding to the stored reply character signals.

The delay line 58 has sufficient memory capacity to store simultaneously all of the query-and-reply characters for all twelve desk units 20. Thus, since each desk unit has a display format of 24 characters, the delay line has a memory capacity sufficient to store signals representing 288 characters. As will be explained, the delay line 58 also includes some additional storage capacity for control purposes.

Each of the twelve desk units 20 is assigned a predetermined portion consisting of 24 so-called "slots" in the delay line storage sequence, and the signals representing the query-and-reply characters for that desk unit are always stored in those assigned slots. Each such slot contains eight successive binary bits, of which five can be termed actual data bits while the remaining three are control bits. For reasons which will become apparent, the stored data for the twelve desk units are "interlace" in the delay line, so that the character slots for any one desk unit do not occur in succession as the data bits emerge from the output of the delay line memory.

FIGURES 10A, B and C, combined, show the "mapping" of the stored bits in the delay line memory 58. Using basically the same form of illustration as in FIGURE 6 of the above-identified Windels et al. application, the delay line is shown as a series of vertical columns (slots) each containing 8 bits which can be either marked or not-marked, i.e. logical one or logical zero. The interlacing of the character slot allocations for the several desk units is accomplished in groups of three, that is, the query-and-reply character slots for desk units #1, 5 and 9 are interlaced in the first section A of 72 "slots" (shown in full in FIGURES 10A, B and C). The character slots for desk units #2, 6 and 10 are interlaced in a subsequent 72 slot section B, and so on.

This interlacing is such that the slot for the first character for desk unit #1 is followed by the slot for the first character for desk unit #5, which in turn is followed by the slot for the first character for desk unit #9, etc., thus forming a sequential group of three-slot segments in the delay line. The first six such three-slot segments in any 72-slot storage section contain all the characters for the first lines of the CRT displays for all three of the desk units assigned to that storage section. These three-slot data storage segments are identified in FIGURE 10 as positions 1–1; 1–2; . . . ; 1–6 (meaning first line, first character; first line, second character; . . . ; first line, sixth character); 2–1; 2–2; . . . ; 2–6 (meaning second line, first character; etc.); 3–1 through 3–6 and 4–1 through 4–6. Between each 72-slot section there is an additional three-slot segment which, for purpose of identification, may be called "5–1," in which various control signals are recorded for the next following group of three desk units, as will be explained.

DESK UNIT SAMPLING

Referring now to the lower left-hand corner of FIGURE 9A, the keyboards 22 of the desk unit 20 are sampled in succession by means of a time-division multiplexing arrangement including a multiplex keyboard drive 66 which cycles at a sufficiently fast rate to insure detection of each momentary depression of any of the query input keys 24 or 26 (FIGURE 1). The multiplex keyboard drive 66 includes essentially, a counting circuit which provides a drive pulse for each of the keyset devices in timed sequence. Each of these keys operates a single "make" contact connected to a diode matrix (shown partially completed for the first two keysets at 70–1 and 70–2 in FIGURE 11) so arranged that the closure of any one key contact produces a corresponding unique set of circuit completions to the individual lines of a seven-wire multiple 72, thereby defining the individual parallel "bits" of a code representative of the selected stock identification or function key. Referring also to FIGURE 12, it will be seen that the stock identification keys 24 control the connections to only five of the lines. Depression of any function key 26 "marks" the sixth line by completing a connection thereto, and also controls connections to the first five lines. The "Clear" key 30 controls the connection only to the seventh line.

The single line input 74–1, . . . 74–12 of each of these keyboard circuits 22–1, . . . 22–12 is energized in succession by the multiplex keyboard drive 66 under control of the central timing equipment 62. If any key is depressed at the time of energization of the input line to that keyboard, one or more of the lines of multiple 72 will conduct current to a keyboard buffer and analyzer generally indicated at 78, the particular combination of lines energized being determined by the key selected as outlined above. All twelve keyboards (#1 through #12) are sampled or "scanned" in this manner during the time required for three complete traverses or "spins" of the delay line 58. During one delay line spin, keysets #1, 2, 3 and 4 will be sampled, during the next spin keysets #5, 6, 7 and 8 will be sampled, and during the third spin keysets #9, 10, 11 and 12 will be sampled. The scanning operation then begins a new cycle.

FIGURES 10A, 10B and 10C include timing diagrams to show the relationship between the operation of the delay line 58 and the sampling of the keysets of the desk unit 20. For example, keyset #2 will be sampled during the first 72-slot section A of the first delay line spin (corresponding to the time that the display characters for desk units #1, 5 and 9 are emerging from the output of the delay line). That is, during this period the line 74–2 leading to the keyboard switch and diode circuitry of keyset #2 will go "high" (logical one). During the next 72-slot sections B, C and D of the first delay line spin (not shown in FIGURE 10), keysets #3, 4 and 5 will be sampled in this manner.

On the second and third spins of the delay line, the remaining keysets will be sampled. For example, on the second spin, keyset #6 will be sampled while the delay line output is passing through the first 72-slot section A, and so forth.

When the keyboard "sample" signal on line 74–1 (or 74–2, etc.) goes low at the end of the corresponding sample period, the seven-bit signal is shifted into a temporary buffer storage generally indicated at 78. At the start of the immediately following three-character control section 5–1, as gated by a line from the central timing equipment 62, this keyboard signal stored in the buffer is analyzed by an OR circuit forming part of circuitry 78 to determine whether any one of the seven lines was activated at the time of sampling, i.e. to determine whether one of the keys 24 or 26 had been depressed at the end of the immediately preceding sample period. If this analysis shows, by the presence of a signal appearing at the output of the analyzer OR circuit resulting from the operation of any one of the keyset keys, that a key had been depressed, a line 81 is energized to mark the fifth bit (identified as $S_A$) of the slot in the control segment 5–1 corresponding to the sampled keyset. No recording of data representing the particular keyset depressed is made at this time, however, because the data might be in error due to bounce of the switch contacts, or the like.

Which slot the control bit $S_A$ is placed in depends, of course, upon which of the three possible spins the delay line is passing through. To indicate the proper one of the three possible slots, the timing apparatus 62 includes conventional means to generate, among others, a gate signal which goes high only at the time this slot is passing into the delay line. This gate signal, indicated as SLC in FIGURE 10, goes high during the first slot of each three-slot segment while in spin #1, during the second slot while in spin #2, and during the third slot while in spin #3. Thus, assuming as above that keyset #2 had just been sampled in delay line spin #1, SCL will serve to gate the marked bit $S_A$ into slot A of the control segment. This bit will be directed to the fifth bin of the slot by a gating signal from the fifth bit counter BDE (FIGURE 10A). It should be noted at this point that all of the timing signals designated along the left side of the charts starting on FIGURE 10A are generated within the timing apparatus 62. The timing apparatus 62 includes a plurality of counters which are interrelated to produce the required gating control signals to which references are made herein.

With the $S_A$ bit marked for keyset #2 to indicate "Character Present in the Keyset," circuitry will be activated during the next complete cycle (i.e. three spins of the delay line later) to write the keyset data from the buffer 78 into the delay line during the second section B immediately following the three-slot control segment 5–1 for keyset #2. Detection of the $S_A$ bit is indicated diagrammatically by a coincidence detector and control 82 which receives the delay line signals and is activated by a suitable timing signal from counters 62. The output of detector 82 controls a gate 84 between a conventional parallel-to-serial converter or strobe circuit 86 and the input gate 60 of the delay line. This strobe circuit is operating continuously to convert the five parallel data bits from the 7-line multiple (the 6th and 7th bits are those which indicate, respectively, that a function key 26 or the clear key 30 had been depressed) to a serial signal at the delay line frequency and properly synchronized with the individual bins of each slot as it emerges from the delay line.

The output of the stroke circuit 86 must be gated in timed relationship with respect to the occurrence of the assigned slots of the delay line in order to place the sampled keyset character in the allotted slot in the delay line memory 58. This slot is identified by a marker control bit $Q_W$ (standing for Query Write) which has been gated into the second bin of the proper slot. Assuming, for example, that a character read out from keyset #1 is the first stock identification character (e.g. "T" for The Teleregister Corporation), the $Q_W$ marker bit will initially be located in the first slot of the first three-slot segment of the first 72-character section A of the delay line. The coincidence detector 82 is arranged to detect this marker bit and, having been previously "enabled" by detection of the immediately preceding $S_A$ bit as discussed previously, emits an output signal to open gate 84 and record the sampled data in the delay line. Thereupon, the bit identified as $S_B$ is gated into the control segment to indicate that the character present in the keyset has been read, so that this character will not be read a second time.

After recording the first keyboard character, the $Q_W$ bit is automatically removed from its position in the first slot of the first segment and shifted over into the first slot of the second segment, e.g. in accordance with the techniques described in the above-identified Windels et al. application. Thus, if there is a second stock identification character (such as C or TC), it will be written into this second segment, and so on up to the limit of five stock identification characters.

It should be noted that the cycling of the multiplex keyboard drive 66 is sufficiently fast that each keyset character will be sampled at least twice, once to detect its presence, and the second to write the character into the delay line. In the specific embodiment described herein, one complete sample cycle (3 delay line spins) required 13.44 milliseconds. The length of the delay line, i.e. the traverse time, is 4.484 milliseconds, and the data bits are entered into the delay line at the frequency of 534,500 bits per second.

If any stock identification key 24 is pressed after five characters already have been recorded in the delay line 58, the equipment does not respond. As a part of the timing function of the timing apparatus 62, the input gate is inhibited by a timed control signal at the end of the fifth character of line 1. The sixth character position is programmed to be receptive only to reply data as noted below. If a function key 26 is pressed at any time after the first stock identification character is recorded, the function character is always placed in the segment or position identified as 2–1 (second line, first character). For example, if the "Last, Bid, Asked" function key is pressed, the letter L of this group is entered into position 2–1 by means of conventional gating control means responsive to the marking of the sixth bit of the keyset character as sensed by the analyzer 78. During the same spin of the delay line, the bit labelled $H_P$ (standing for high priority) is marked in the seventh bin of the corresponding slot of the control segment 5–1. The detection by the analyzer 78 of the function character identifying mark in the sixth bit position produces a control signal which is used to gate the $H_P$ bit into the delay line. This is the so-called High Priority Flag and is used to indicate to the Communications Equipment 50 that a complete query has been entered in the delay line memory 58 and requires servicing. As will be described in more detail below, this Communication Equipment operates almost instantaneously to obtain from the satellite station 36*a* (FIG. 8) a reply message which is entered in the remaining slots of lines 2, 3 and 4 of the querying keyset. These reply slots are positions 2–2 and 2–6, 3–1 through 3–6, and 4–1 through 4–6. In addition, under certain circumstances a special display character is entered as a part of the reply message in the appropriate slot of position 1–6. For example, a character may be entered which indicates the latest trend of the stock price, as by means of a plus or minus sign.

It was previously noted that data inserted into the delay line memory 58 were recirculated, by a feedback circuit 64 and gated back into the delay line to form a recirculating memory. It was also indicated that, if a new stock identifying key were pressed, the new character would override the memory character and be displayed on the screen. When the broker presses one of the stock identification keys, the establishment of the character in the buffer-analyzer 78, in addition to the gating of the $S_A$ bit, also opens the gate in the feedback loop 64. Opening of that gate effectively erases the data stored in the delay line memory 58 for those slots alloted to the particular desk unit. The erasure of these data bits from the delay line memory is, in turn, effective to erase the previous display from the associated display tube.

On the other hand, if, without depressing a new stock identification key, the broker presses a new function key, the resulting coded signal includes the sixth bit function identifier. That sixth bit function identifier establishes the times relationships of the subsequent operations to begin at the first character position of the second line. Thus, the following erasure of the data bits from the delay line memory, and the associated CRT display affects only the function, i.e. lines two to four. Therefore, the stock identification characters will not be erased from either the delay line memory or the CRT display. When that particular desk unit is polled, the content of the delay line is read, including the old stock identification which is still circulating in the memory, as well as the new function query.

Depressing the "clear" key 30 also establishes a signal which actuates the gate in the feedback circuit 64, obliterating the signals from those slots of the delay line memory 58 allotted to that particular desk unit, thereby erasing all displays from the associated CRT.

POLLING OF RQT UNITS

Each ICS (FIGURE 8) continually "polls" its associated RQT units in sequence, in search for keyset queries which are to be serviced. Predominantly, these polls are of the "high priority" category, meaning that the search is only for queries which have not yet been serviced. Such high-priority polls take place every second or so, in order to insure rapid reply to a query entered by a stock broker. At less frequent intervals, e.g. every 3-seconds, the ICS initiates a "low-priority" poll wherein all queries recorded in the delay lines of the associated RQTs will be serviced, even though they have already been serviced previously. This is to insure that any changes in stock price (or other queried data), occurring since the previous servicing, will periodically be entered in the reply section of the delay line for updating the display at the respective keyset.

When any RQT is not operating with its ICS, it is in an idle mode, monitoring the incoming line 40. From the ICS, there appears on the line 40 a continuous carrier signal. Whenever an intelligence signal is issued by the ICS, the frequency of the carrier signal is modulated in accordance with the intelligence signals. These intelligence signals are always in the form of a pulse code. Each RQT associated with one of the ICS units is given a predetermined identifying address code. During the polling sequence, the ICS will send out a series of pulse-code signals including an SOP (Start-of-Poll) signal followed by an address signal identifying the particular RQT being polled.

The modulation of the carrier signal by the pulse code signals of the ICS is accomplished by a Modem (modulator-demodulator) which may, for example, be of the type produced by The Western Electric Co. and identified with their model No. WE–202B. At the RQT, a similar Modem demodulates the signal and restores the pulse code signals.

The ICS signals are directed by the Modem through a line 100 and gates 102, 104 to stage A of a three-character communications buffer 106. The received signals are stepped through this buffer and, when the stage C, are examined by a conventional analyzer 108. When in the idle condition, detection of any signal other than SOP produces no response by the RQT equipment. However, when SOP is sensed, the output signal of the analyzer 108 activates conventional circuitry to examine the next following character to determine whether it is the RQT address.

When an RQT decodes its own address, an idle flop 110 is set to its "busy" state, to actipated the RQT for the incoming poll. The carrier for the output line 42 of the Modem is energized, as by means of signals directed through an interconnection cable 112 to a control unit 114 which operates the Modem. With this carrier energized, the RQT is in effect connected to the polling ICS, and the remaining RQT units are in effect disconnected.

Simultaneously with this activation, a query seeker 116, which comprises a controlled combination of flip-flop counters, programmed to sequentially identify the delay line slot assignments of desk units, in order, is started, also by signals directed through cable 112, and operates to scan the stored data for each keyset in sequence. This seeker is controlled by timing signals (T) from the counters 62, and opens a gate 118 connected to the feedback line 64 of the delay line 58 at the proper periods to pass the stored query characters of only a single keyset at a time. Seeker 116 is "stepped" from one keyset to the next in sequential order, and stays "connected" to any keyset requiring service until this servicing has been completed. To provide the most rapid transfer of data, gate 118 is opened for the selected keyset each spin of the delay line, rather than every three spins as during the keyboard sampling cycle.

If the ICS unit is carrying out a "high-priority" poll, as described above, the fifth bit of the five-bit RQT address signal will be marked (logical one); otherwise this fifth bit will be blank (logical zero). The condition of this fifth bit is decoded by the analyzer 108 and controls a Priority flop 120. If a high priority poll is being called for, flop 120 will transmit suitable signals through cable 112 to activate a high priority detector 122. This detector also is supplied with suitable timing signals (T) from the central counters 62, and serves to determine whether the $H_P$ bit (see above) is marked for the keyset then being scanned by the seeker. If such a marked bit is found, this detector signals a control circuit 124 to open a gate 126 to pass the query data for that keyset through another gate 128 and thence through gate 104 into the communications buffer 106. (Gate 128 is open at this time, but not gate 102, due to control signals generated when the RQT was transferred from "idle" to "busy" mode.)

The particular character being transferred from the delay line 58 is determined by stored control bits identified as $Q_R$ in FIGURE 10, e.g. in accordance with techniques set forth in the above-identified Windels et al. application. Initially, $Q_R$ (standing for Query Read) is marked in position 1–1, so that the character in 1–1 is read out first, and $Q_R$ is shifted to position 1–2. At the next opportunity, the character in 1–2 is read out, and $Q_R$ is shifted to 1–3, etc. When $Q_R$ finally is shifted to position 1–6, a circuit is activated to cause the reading circuits to read out next the function character stored in position 2–1, rather than the marked position 1–6 (which does not contain a query character, as discussed above). When the function character has been read out, and has been transmitted to the ICS, the RQT is caused to revert to its "receive" mode (REC flop 130 set) for the subsequent reply message to be transmitted by the ICS.

The communication buffer 106 is required because the transmission lines 40 and 42 operate at a speed much slower than delay line 58. Thus, during reading of the query message, there will be many delay line spins in which no data is read out. The actual reading and transfer of each character is controlled by gate 126 which receives enabling signals $Q_R$ and "A empty," so that data is passed on to the buffer only when the first stage is ready to accept a character. When a character is transferred, the $Q_R$ bit also is automatically shifted to the next slot in the delay line to be read.

The query message output of buffer 106 is directed through a gate 132 to the Modem unit where the pulse code signal is again used to frequency-modulate the carrier signed for transmission over the line 42 to the ICS. At the satellite station 36a, the query message is stored and analyzed (e.g. as by techniques similar to those described in the above-identified Avakian et al. Patent No. 3,133,268) to produce a corresponding reply message giving the requested information. The ICS thereupon transmits this reply message to the RQT originating query.

Each reply message consists of 21 characters, comprising SOM (Start-of-Message), the RQT address, Trend (for line 1, character 6 of the CRT display), and 18 other characters consisting of three groups of six characters, each group serving to control one of the remaining lines 2 through 4 of the display. The first character of the first group of six is identical to the function character transmitted in the query. For example, if the "Last, Bid, Ask" function is sent, the letter "L" from the query message is recorded in the delay line slot for the second line, first character (position 2–1), and the reply also will include the letter "L" to be placed in the same delay line slot.

This reply message is fed from the Modem through line 100 and gates 102, 104 to the communication buffer 106, i.e. just as was the original RQT poll message. The output of the buffer, however, now is directed through a gate 134 (opened by signals in control cable 112 when the RQT is "busy" and in "receive" mode) and a timing gate 136 to the input 60 of the delay line 58 This timing gate 136 is controlled by signals from the seeker 116 as well as by signals from a timed detector 138 which scans the delay line data for the control bits identified in FIGURE 10 as $R_W$ (Reply Write). Gate 136 completes the circuit to the input 60 at the correct times to place the reply message characters (not including the SOM and RQT address characters) in their proper slots in the delay line 58.

Initially, the control bit $R_W$ is marked in position 1–6, and thus the first character (Trend) is placed in that position. Thereupon, the marked $R_W$ bit is shifted to position 2–1 to identify the location of the next slot to be filled by the function character. After loading this slot, the marked $R_W$ bit is shifted forward one more slot to identify position 2–2.

The character following the function character is referred to herein as an "indicator character," and is not itself loaded into the delay line 58 nor displayed on the CRT of the corresponding keyset. Instead, this indicator character serves to control the mode of display to be used for the next four characters of the reply. Thus, gate 136 is suitably activated by the timing signals to transfer the indicator character to a temporary storage register 140 where it is analyzed to produce signals corresponding to the code of the stored character. These signals are effective to produce from a controls unit 142 the required results as will be described. The $R_W$ bit remains marked in position 2–2 during this analysis.

There are nine different indicator characters, each consisting of a distinctive five bit code and representing a specific control effect as outlined below:

(1) Code 01000—Meaning: "The following four characters are Hundreds, Tens, Units and a Fraction, the Denominator of which is "8," respectively." This indicator character will appear when the queried stock is trading in eighths. The control signals generated by analysis of this code will do the following:

(a) Mark the 3rd bit in position 2–5. (This bit is identified as $D_2$ in FIGURE 10, and serves to cause delay of certain data being sent to the corresponding CRT, in order to properly position both the denominator and numerator of the fraction as will be explained.)

(b) Mark the 4th bit in position 2–5. (This bit converts the stored character to the code identifying a small 4 x 5 matrix character, required for the fraction to be displayed; see also Table III hereinbelow.)

(c) Force into position 2–6 the code for a small "8," i.e. 11000, to define the denominator of the fraction.

(d) Mark the $R_W$ bit of position 2–6. As the first of the next four characters is received, it is stored in position 2–2, and $R_W$ then is shifted to position 2–3. The following three characters are placed in positions 2–3, 2–4 and 2–5, $R_W$ controlling the entry in each case. Under ordinary circumstances, the $R_W$ bit would next be shifted to position 2–6, but a marked bit already is present in this position, due to the operation of the indicator character. The presence of marked $R_W$ bits in both 2–5 and 2–6 is detected as an "end-of-line" signal, and the $R_W$ bit thereupon is marked in position 3–1, thus causing the next character to be placed in that position. If this "end-of-line" signal is detected when operating on the storage for line 4 (i.e. positions 4–1 through 4–6), an additional signal is generated to reactivate the seeker 116 and cause it to shift to the next keyset in the sequence.

(2) Code 01100—Meaning: "The following character is another indicator character." This will be used for stocks trading in sixteenths and thirty-seconds. Upon decoding of this character, an inhibit circuit (not shown) is activated to prevent writing the following character in the delay line 58. This first indicator character always will be followed by one or the other of indicator characters (3) or (4) below.

(3) Code 01101—Meaning: "The following characters are Units, Fraction, Fraction, respectively and the Denominator is 16." The control signals generated by the analysis of this code do the following:

(a) Mark the 3rd bit in position 2–3. (This bit is identified as $D_{10}$ in FIGURE 10, and serves to cause delay of certain data being sent to the CRT, to properly position both the denominator and numerator of the fraction to be generated.)

(b) Mark the 4th bit in position 2–3. (This converts the received character to the code for a small 4 x 5 matrix character.)

(c) Mark the 4th bit in position 2–4. (See above.)

(d) Force into position 2–5 the code for a small numeral "one," i.e. 10001.

(e) Force into position 2–6 the code for a small numeral "6," i.e. 10110.

(f) Mark the $R_W$ bits of positions 2–5 and 2–6. Upon completion of the above operations, the immediately following three characters of the reply are written into positions 2–2, 2–3 and 2–4. Thereafter, the $R_W$ bit will be marked in the first position of the next line (e.g. position 3–1), unless the fourth line is not being operated on, in which event the seeker 116 is signalled to step to the next keyset since the reply message will have been completely recorded.

(4) Code 01110—Meaning: "The following characters are Units, Fraction, Fraction, respectively, and the Denominator is 32." The control actions taken upon decoding of this character are the same as for (3) above, except that the codes for small 3 and small 2 (i.e. 10011 and 10010) are written into positions 2–5 and 2–6.

(5) Code 00001—Meaning: "The following four characters are full size." This will be used for a reply to a query requesting Volume, Price-Earnings Ratio, Market Trend and Stock Dividend. Upon decoding of this character, $R_W$ is marked in position 2–6 as in (1) above, and the next four characters are written directly into positions 2–2, 2–3, 2–4 and 2–5.

(6) Code 00100—Meaning: "The following four characters are Tens, Units, Tenths and Hundredths." This indicator is used for Dividend, Market Averages, Time Since Last Sale and Commodity Prices. The control signals generated by decoding of this character do the following:

(a) Shift the marked $R_W$ bit from position 2–2 to position 2–3.

(b) Mark the 4th bit of positions 2–5 and 2–6 to cause the generation of small 4 x 5 matrix characters in the last two positions of the line.

(c) Mark the 3rd bit of position 2–4. (This bit is identified in FIGURE 10 as $P_{D8}$ (standing for Preset Delay 8 bits) and serves to cause delay of certain data being sent to the CRT to properly position the two following small characters in positions 2–5 and 2–6.)

After these control actions, the next four data characters of the reply message are written directly into positions 2–3 and 2–6.

(7) Code 00101—Meaning: "The following characters are Tens, Units, Tenths, Hundredths, respectively, and a 'plus' sign is to be written in position 2–2." This reply is used for Market Average Changes. The Control actions resulting from decoding of this character are the same as in (6) above, with the addition of writing the "plus" sign code (01010) into position 2–2.

(8) Code 00110—Meaning: "The following characters are Tens, Units, Tenths, Hundredths, respectively, and a 'minus' sign is to be written in position 2–2." This is essentially the same as (7) above, except that 01100 is placed in position 2–2.

(9) Code 00010—Meaning: "The following characters are to be treated as alphabetics." This indicator is reserved for special operations such as effecting rewrite of a broker's stock quotation board. Decoding of this character causes the 3rd bit in position 2–2 (identified as $T_A$) to be marked, which results in the production of an alphabetic code for the following four character positions during the reading thereof for display purposes and also causes the control bit $R_W$ to be marked in position 2–6 to indicate end-of-line as discussed hereinbefore.

Although the functioning of the indicator characters listed above was described principally with reference to line 2 of the CRT display, it is to be understood that this functioning will be identical for the third and fourth lines.

Under some circumstances, the function character will be a numeric rather than an alphabetic, e.g. for the function key "2, 3, F." When the broker presses such a function key, this fact is sensed by suitable circuitry at the RQT (not shown), and controls are activated to mark the 3rd bit ($T_F$) of the first character in any line where such a numeric function symbol is to be displayed. The presence of this marked bit converts the code to a numeric code.

When a low-priority-poll is carried out by the ICS, the fifth bit following the RQT address is not marked, and hence the Priority flop 120 is not set. Under these conditions, the control signals in cable 112 cause the seeker 116 to stop on each keyset in turn, whether or not its $H_P$ bit is marked in the delay line, and the seeker stays connected to each keyset until all of the corresponding query data slots are scanned out to the ICS. If a query was stored in these slots, the ICS develops a corresponding reply message to be inserted in the delay line, overwriting any previous reply if such is present. Thus, if there has been a change in data previously reported, this will be reflected automatically by the "refreshing" of the stored reply.

CRT DISPLAY CONTROLS

The query and reply data stored in the delay line 58, as described above, appears continuously on the CRT displays of the keysets 20. This continuous display is effected by a time-division multiplexing arrangement so arranged that the display tubes of the various keysets are "painted" in rapid succession corresponding to the order in which the stored data is read from the delay line.

Reading of the delay line data is governed by a gate 150 (FIGURE 9B) controlled by suitable timing signals from the central counters 62. This reading sequence is illustrated on FIGURES 10A, 10B and 10C wherein it is shown, for example, that the display data for CRT #1 is read during the same time block that query or reply data is being written for that keyset. There are four such time blocks for each "spin" of the delay line, during which the stored display data for four successive keysets (e.g. #1, 2, 3, and 4) are read out. A complete cycle, of course, requires three delay line spins, to serve all twelve keysets.

The data read out from the delay line is limited to the 3rd through 8th bits of each slot, i.e. the five basic data bits plus the artificially created data bit of the 3rd bin (such as $T_F$, etc.). These six bits are transferred serially to a register 152 from which they are shifted, in parallel, to a second register 154.

From register 154, four of the data bits are fed directly to a character generator 156 adapted to produce signals for controlling the display on each CRT, as discussed in connection with FIGURE 2. These four data bits correspond to delay line bins #5 through #8, represented by timing counters BDE through BDH. The data bit corresponding to bin #4 is directed to a "small character control circuit" illustrated by a block 158. This circuit detects the presence of a marked bit in bin #4 and in response thereto causes the character generator to produce a signal for developing a small 4 x 5 matrix character, as previously described.

Also connected to the input of the character generator 156 is an alphabetic/numeric control circuit 160 which, in effect, adds one more data bit to this input to determine whether the signal developed by the character generator will be an alphabetic character or a numeric character. This circuit 160 is, in turn, controlled by timing signals because, in most circumstances, whether a character is alphabetic or numeric depends upon the position of the character on the CRT display, and this position is determined by the time at which the basic character data emerges from the delay line.

More specifically, the characters placed in positions 1 through 5 of the top line always will be alphabetic, and therefore circuit 160 will always insert a "logical one" into the character generator when data for these positions is being translated. (As shown in Table III hereinbelow, a logical one in the sixth column identifies the code for "Letters.") Similarly, a logical one usually will be inserted with the data destined for CRT positions 2–1, 3–1 and 4–1, since ordinarily the function characters will be alphabetic. On the other hand, a logical zero usually will be inserted with the data destined for the last five positions in lines 2 through 4 since typically these characters will be numeric.

Under some operating conditions, it is necessary to display a numeric in the first position (such as when the function is "2, 3, F"), or to display an alphabetic in the other positions of lines 2 through 4. As mentioned above, such special displays are indicated by marking the 3rd bin in the delay line slots for character positions #1 or #2, i.e. the data bits identified as $T_F$ and $T_A$. The presence of such a marked bit is sensed by a timed detector 162 connected to the 6th position of register 154, and identified herein with the reference number 155.

If a marked $T_F$ bit is sensed by detector 162, is activates a circuit 164 to cause the alpha/numeric control 160 to insert a logical zero into the character generator 156 when the data *f* or the first character of that CRT line is being translated. This action causes the generator to develop a signal for a numeric display, rather than the alphabetic character which normally would appear in this first position.

If a marked $T_A$ bit is sensed by detector 162, circuit 164 is activated in such a manner, as to cause the alpha/numeric control 160 to insert a logical one into the character generator input whenever the data for the last four characters of the corresponding CRT line are being translated. Thus, these four positions will always display alphabetic characters in such circumstances.

The character generator 156 comprises a diode matrix and associated circuitry to translate an applied permutation code signal, having 6 bits of data, to a corresponding permutation code signal consisting basically of 48 bits of data. Of these 48 bits, 35 are required to define the 5 x 7 display matrix for the large symbols, 7 more are required for the unmarked vertical sweep which sets the spacing between characters, and the remaining 6 bits provide the re-trace time for the six vertical sweeps for each character. When a small 4 x 5 character is to be displayed, there will be only 20 character formulation bits, instead of 35, although if the small character is used as part of a fraction, an additional 7 bits must be marked for one vertical sweep in order to display a fraction line between the denominator and numerator as explained above.

The 48 bit signal developed by the character generator 156 appears on 48 separate output leads which are connected to a conventional strobe circuit 166. This strobe is driven through a lead 168 by a master clock 170 (FIGURE 9A), and converts the generated 48 bit parallel code signal to a corresponding 48 bit serial signal. The individual pulses of this serial signal occur at the frequency of the master clock, which in the present embodiment is 1,069,000 cycles/second. This frequency is so related to the sweep frequencies of the CRT display units 28 (FIGURES 1 and 2) that 48 clock pulses will occur during the time the CRT sweeps out each complete character. Thus, it will be evident that the 48 bit serial signal produced by strobe 166 is adapted to form the characters by intensifying the CRT beam at predetermined spots to create the outline of any desired character.

Taking first the case where the 48 bit serial signal is for a large 5 x 7 character, the output of the strobe 166 is directed through a lead 172 and a gate 174 to a common video line 176. This line carries the serial signal to a multiplex video driver 178 which includes suitable amplifiers and is arranged to service, through video cables 180–1 through 180–12, the CRT displays of all keysets 20–1 through 20–12 in sequence.

The multiplex video driver 178 is also supplied with timing signals by a lead 182 connected to the counters 62. The system is so arranged that all of the cables, except that leading to the one CRT being supplied with data, are supplied with a positive voltage which operates to blank the respective CRT displays and also return the electron beam to the upper left-hand corner of the display in readiness for the next set of sweeps. When a CRT is to be activated, the positive voltage first is removed from the corresponding cable 180. This causes the energization of circuitry at the keyset to start both the vertical and horizontal sweeps of the CRT. As was previously pointed out, the deflection of the electron beam of the CRT is controlled in a manner to produce a separate transversely extending sawtooth raster for each horizontal line of characters to be displayed. The circuit for accomplishing that control is illustrated on FIGURES 13A and 13B. For purposes of description, this may be considered as the circuitry for desk unit #1 although the several desk units are identical. An input signal is applied over line 180–1 from the multiplex video driver 178. That input signal, which is a composite of data signals and synchronizing signals, is applied as input control signal to a first switching transistor 302, and a second switching transistor 304. Additionally, the input signal is applied to a video amplifier 306 to control the bias on the control grid 308 of the CRT 28.

The first switching transistor 302 has the input signal applied, through a suitable bias network, to the base electrode thereof. A charging capacitor 312 is connected between the collector and emitter electrodes of the transistor 302. A charging circuit for the capacitor 312 is provided in a connection from the collector electrode of the transistor 302, through a fixed resistor 314, an adjustable tap on a slidewire resistor 316, to a high voltage power supply line 318 which is, in turn, connected to the positive terminal of a relatively high voltage power supply. The emitter of the transistor 302 is connected to ground through a low voltage bias voltage means. A diode 320 connected between a voltage supply of predetermined magnitude and the collector of the transistor 302 limits the voltage to which the capacitor 312 can be charged. The first switching transistor 302, together with the associated charging capacitor circuit, comprise a first ramp signal generator with a relatively short time-constant. The output of the first ramp signal generator, taken at the collector of transistor 302, is connected, through a filter network 322, to the first control grid of a first dual-triode differential amplifier 324.

The input signal on the line 180–1 is also applied again through a suitable input bias network to the base electrode of the second switching transistor 304. The collector of the transistor 304 is connected to ground. The emitter of the transistor 304 is connected, through a blocking diode 326, to an integrator including a capacitor 328, a first resistor 330, and a second resistor 332; the first resistor 330 being connected between one side of the capacitor 328 and ground, and the second resistor 332 being connected between the other side of the capacitor 328 and a source of charging potential. The anode of the diode 326 is connected to the junction between capacitor 328 and the resistor 332. The same junction is also connected to the base electrode of a third switching transistor 334. The emitter of the transistor 334 is connected, through a low voltage bias source, to ground. The collector of the transistor 334 is connected, through a blocking diode 336, to the resistor 332. A charging capacitor 338 is connected directly between the emitter and the collector of the transistor. A fixed resistor 340 and a variable resistor 342 are serially connected between the collector of the transistor 334 and the high voltage supply line 318. A clamping diode 343 is connected between emitter of the transistor 334 and a low voltage source of predetermined value. The second switching transistor 304 and the third switching transistor 334, together with the associated charging circuits comprise a second ramp signal generator having a substantially longer time-constant than the first ramp signal generator. The output signal of the second ramp signal generator, taken at the collector of the transistor 334, is connected directly to a first control grid of a second dual-triode differential amplifier 340.

The output of the second ramp signal generator is also connected, through a coupling capacitor 342, to the base electrode of a fourth switching transistor 344. A diode 345 is connected between ground and the junction between the capacitor 342 and the base of the transistor 344. A biasing circuit, including a resistor 342 and a resistor 348 serially connected between a voltage supply source and ground, is provided for the base electrode of the transistor 344; the base electrode being connected to the junction between the two resistors. The emitter of the transistor 344 is connected to ground. The collector of the transistor 344 is connected, first, through a fixed resistor 350 and a variable resistor 352 to the high voltage supply line 318. Second, the collector of the transistor 344 is connected, through a blocking diode 354 to a charging capacitor 356, the other side of which is grounded. The junction between the diode 354 and the capacitor 356 is connected, through a limiting diode 360, to a voltage supply source of predetermined magnitude.

The emitter of the second transistor 304 is also connected, through a blocking diode 362, to the base electrode of a fifth switching transistor 364. The emitter of the transistor 364 is connected through a low voltage bias source to ground. The collector of the transistor 364 is connected to the junction between the diode 354 and the capacitor 356. An integrating circuit, including a first resistor 366, a charging capacitor 368 and a second resistor 370 serially connected between the high voltage supply and ground, comprises a bias circuit for the transistor 364. The base of the transistor 364 is connected to the junction between the resistor 366 and the capacitor 368. The fourth and fifth switching transistors 344 and 364, together with their associated charging circuits comprise a third ramp signal generator having a time-constant which is much larger than that of the second ramp signal generator. The output of the third ramp signal generator, taken at the junction between the diode 354 and the capacitor 356, is directly connected to a second control grid of the first differential amplifier 324.

The output of the first differential amplifier 324, taken across the anodes of the dual-triode, is connected across the vertical deflection plates 372 and 374, respectively, of the CRT 28. The transistor 376 in the common cathode path of the first differential amplifier 324 constitutes a constant current impedance for the amplifier 324, thereby minimizing the effect of unwanted stray signals. An adjustable vertical centering bias signal is provided for the first differential amplifier by a fixed resistor 378, and a slidewire resistor 380 connected between the high voltage supply line 318 and ground. The slider of the slidewire resistor 380 is connected through a fixed resistor 382 and a capacitor 381 to ground. The junction between the resistor 382 and the capacitor 381 is connected to the first control grid of the amplifier 324.

Similarly, an adjustable horizontal centering bias signal is supplied, through the interconnections of fixed resistors 386, and 388, adjustable resistor 390, and capacitor 392. The bias thus developed is applied to the second control grid of the second differential amplifier 340. The output of the second differential amplifier 340, taken across the anodes of the dual-triode, is connected across the horizontal deflection plates 394 and 396, respectively, of the CRT 28. Again, a transistor 398 in the common cathode circuit of the second differential amplifier 340 constitutes a constant current impedance for the amplifier, minimizing the effect of strays in that amplifier.

In operation, the synchronizing signals are inserted into the line 180–1, along with the date pulse signals, at the multiplex video driver 178. The synchronizing signals are all of about 4 volts, positive, while the data signals appear as a series of negative going pulses. The synchronizing signals are of three types, differing from each other in time duration. A first set of synchronizing signals is of one data bit duration and occurs after each seven data bit group. These synchronizing signals identify the end of each vertical stroke of the electron beam. A second set of synchronizing signals are of nine data bits duration and occur at the end of each horizontal line, that is after the completion of the sixth character in each line except the fourth line. A third set of synchronizing signals is of much longer duration. For purposes of accomplishing the synchronizing function, this set of synchronizing pulses need be only of a time duration commensurate with the seven-stroke formation of a single character including the space strokes. However, for purposes which will appear hereinafter, the synchronizing pulses of the third set are of much longer duration. These pulses occur after the completion of the sixth character of the fourth line (even if there should be no actual character displayed) to identify the end of the frame.

The initial condition of operation to be considered is that prevailing just before the beginning of the first data pulse signal. The signal on the line 180–1 will be the latter part of the end-of-frame synchronizing pulse, a steady 4 volts positive. The positive signal applied to the base of the first transistor 302, an NPN transistor, renders that transistor conductive, effectively short-circuiting the capacitor 312. At the same time, the positive signal applied to the base of the second transistor 304, a PNP transistor, has held that transistor in a non-conductive state for the interval during which the positive potential was applied. Since the end-of-frame signal is of long duration, the transistor 304 will have been non-conductive for a long time, During that time, the integrating capacitor 328 will have been charged, through the resistors 330 and 332, to a maximum voltage, rendering the third transistor 334 conductive. The conduction of the transistor 334 holds the capacitor 338 in a discharged state. Similarly, the non-conductive state of the transistor 304 has allowed the integrating capacitor 368 to be charged to a maximum value, rendering the fifth transistor conductive. This, in turn, holds the capacitor 356 in a discharged state.

With three three capacitors 312, 338 and 356 all in their minimum or discharged state, the output signals of the three ramp generators applied to the deflection plates of the CRT are such that the electron beam is deflected to the position which is the starting position of the first upward stroke of the first character line. The positive signal on the line 180–1 is also applied to the control grid 308 of the video amplifier 306. This, in turn, effectually blanks the electron beam so long as the positive signal is applied.

With the termination of the positive pulse signal, and the arrival of the first data bit, the first transistor 302 is rendered non-conductive and the second transistor 304 is rendered conductive. Simultaneously, the blanking signal is removed from the control grid 308 of the CRT 28. When the first transistor 302 is not conducting, the capacitor 312 begins to charge through its associated resistors. As the potential across the capacitor 312 increases, a corresponding signal is applied to the vertical deflection plates causing the electron beam of the CRT to describe an upward stroke. The time-constant of this ramp signal generator is sufficiently short as to accommodate the relatively high frequency of the successive vertical strokes. The appearance of marked data pulses on the line 180–1 during this upward stroke, applied through the video amplifier 306 to the control grid 308 of the CRT 28, causes the electron beam to be momentarily intensified, thereby developing the selected bright spots on the face of the tube 28 constituting part of the display.

Simultaneously, the conduction of the second transistor 304 discharges the capacitor 328, thereby rendering the third transistor 334 non-conductive. With the third transistor 334 not conducting, the capacitor 338 begins to charge through its associated resistors. As was previously noted, the time-constant of the charging circuit is much longer and is designed to produce a ramp signal which will effect the horizontal traverse of the electron beam of the CRT 28.

During this interval, the fourth transistor 344 is biased into a conductive state, back biasing the diode 354. The back bias on the diode 354 effectively open-circuits the charging path for the capacitor 356. Accordingly, no charge is being applied to the capacitor 356, even though the fifth transistor is rendered non-conductive by the conduction of the second transistor 304.

At the end of the first vertical stroke of the electron beam, or stated otherwise, after the passage of seven data bit times, an end-of-stroke synchronizing pulse appears on the input line 180–1. This pulse is of a one data-bit time duration. That end-of-stroke pulse turns "on" the first transistor 302, discharging the capacitor 312, thereby deflecting the electron beam in the CRT 28 to the beginning of a stroke position. In the meantime, the charging of the capacitor 338 has progressed sufficiently to cause the electron beam to be deflected slightly to the right. Therefore, the electron beam is in a position to start the second stroke slightly displaced from the first stroke.

The end-of-stroke pulse also caused the second transistor 304 to be turned "off" for the duration of the pulse, allowing the capacitor 328 to begin to charge. However, since the pulse was of short duration and the time-constant of the integrator is long, the transistor 304 will have been restored to conduction before the charge on the capacitor has reached that level necessary to turn "on" the third transistor 334. Therefore, the capacitor 338 continues to charge relatively slowly to produce the ramp signal necessary to effect the complete horizontal deflection of the electron beam. The capacitor 328 will, of course, be discharged as soon as the transistor 304 has been restored to conductivity.

In a similar manner, while the transistor 304 is momentarily non-conductive, the integrating capacitor 368 starts to charge, but is discharged before it reaches that level necessary to turn "on" the transistor 364. Here, too, the capacitor 368 is discharged as soon as the transistor is restored to conductivity.

The foregoing procedure with respect to the charging and discharging of the capacitor 312 for each of the vertical strokes of the electron beam during the formation of the first line of display characters, a one bit-time end-of-stroke synchronizing pulse occurring after each stroke. Since these one bit-time pulses are of insufficient time duration to affect the conductivity of the third transistor 334, the capacitor 338 continues to charge until the electron beam has been deflected to the right-hand end of its travel.

After the last vertical stroke of the first character line, the multiplex video driver 178 delivers an end-of-line synchronizing pulse. This pulse, it will be remembered, is of a nine bit-time duration. The effect of this synchronizing pulse is the same as the shorter one, so far as it relates to the first transistor 302 and its associated ramp generator, the vertical deflection is restored to a starting position. Again, the second transistor 304 is rendered nonconductive and the integrating capacitor 328 starts to charge. This time, however, the time duration of the positive pulse is sufficiently loud, with respect to the time-constant of the integrating network of the capacitor 328 that the potential to which the capacitor 328 is charged is of sufficient magnitude to render the third transistor 334 conductive. The conduction of the transistor 334 discharges the capacitor 338. The discharge of the capacitor 338 charges the horizontal deflection to position the beam at the left-hand side of the display area of the tube 28, at the beginning of a raster. The discharge of the capacitor 338 also causes a short duration negative pulse to appear at the base electrode of the fourth transistor 344, turning it "off" for the brief moment of the negative pulse. During the moment when the transistor 344 is non-conductive, charging current flows through the diode 354 to the capacitor 356, applying an increment of charge on the capacitor 356. The increment of charge thus placed on the capacitor 356 is of sufficient magnitude that, when applied to the vertical deflection plates of the CRT 28, the electron beam is positioned at the beginning of the second line of characters on the display area of the tube 28. At the end of the short pulse on the transistor 344, that transistor is restored to conductivity, again back biasing the diode 354. The increment of charge on the capacitor 356 cannot leak off through the diode 354. Additionally, even though the end-of-line synchronizing pulse was of longer duration than the end-of-stroke pulses, the time duration is not sufficient to allow the integrating capacitor 368 to reach that value at which the transistor 364 would be turned "on." Consequently, the increment of charge remains on the capacitor 356 throughout the remainder of the horizontal traverse of the electron beam. The next succession of data pulses and end-of-stroke synchronizing signals follows as in the first raster line, the vertical deflection stroke ramp signals being super-imposed on the steady state bias supplied by the charge on the capacitor 356.

At the end of the second raster line, another end-of-line synchronizing pulse is supplied and the procedure is repeated with a second increment of charge being applied to the capacitor 356. The second increment of charge on the capacitor 356 is added to the first increment and causes the electron beam to be deflected to a position at the beginning of the third raster line.

This procedure is repeated for each successive raster line until the end of the last line is reached. After the last vertical stroke of the last line has been completed, there is provided an end-of-frame synchronizing pulse. This pulse is of much longer duration than was the end-of-line pulse. The effect of this pulse is the same as that for the end-of-line pulses with the addition that the integrating capacitor 368 is allowed to reach that charge level necessary to turn "on" the transistor 364. When the transistor 364 has been turned "on," the capacitor 356 is discharged. In the meantime, capacitors 312 and 338 have also been discharged. With all three of these capacitors in their discharge condition, the electron beam of the CRT 28 is deflected to be in position to being the first raster line again as indicated generally by the re-trace line 186 of FIGURE 2. Actually, because the second ramp signal generator capacitor 338 is discharged before the capacitor 356, the re-trace of the electron beam will first move to a position which would represent the beginning of a fifth line, then to the beginning of the first line. This condition will remain until the end of the positive synchronizing signal, awaiting the reception of the next series of data pulses. If, as in the illustrative embodiment, there are twelve desk units 20 being serviced by the one RQT, the multiplex video driver will hold the 4-volt bias or synchronizing signal on input lead 180–1 during the entire time that the other eleven desk units are being serviced.

All during the formation of these raster traces, during the time interval between the end-of-stroke synchronizing pulses, the multiplex video driver 178 supplies the timed data bit pulses through the line 180–1 to the video amplifier 306, thence to the control grid 308 of the CRT 28. These data bit pulses provide the momentary intensification of the electron beam in its traverse along the several vertical strokes to form character images on the face of the CRT.

It should be noted that the frequency of the data bits applied to the CRT is greater, by a factor of 2:1, than the frequency of the data bits stored in the delay line 58, due to the frequency divider 188 (FIGURE 9A) between master clock 170 and the timing counters 62. In general, it has been found advantageous in a system of the type disclosed to utilize a CRT data bit frequency which is a harmonic multiple of the delay line frequency. A 2:1 frequency ratio is preferred in the present instance, but beneficial results can be achieved with other multiples such as 1½, 3 and 6. The relative frequencies chosen can permit convenient multiplex sharing of a single character generator 156 without flicker or significant loss of brightness at the individual CRT units. Most components of the character generator need not operate at the higher frequency, thereby assuring simpler, more reliable and less expensive components. Also, relatively high video rates can be used to produce the CRT characters quickly and in detail, without requiring that the delay line itself operate at such high data rates. Thus, a relatively larger number of characters can be displayed on the face of the CRT.

Each 48 bit character is transmitted to its CRT during the time required for three 8-bit characters to emerge from the delay line 58. Since each 48 bit character corresponds to only one delay line character, there is a seeming mismatch of 3:1 in data output rates. However, the delay line data is interlaced on a 3:1 basis, and therefore, the net data rates are actually matched. It may be noted, in this regard, that the delay line character read out during any one 3-slot segment (FIGURE 10) is converted to a 48 bit character and strobed into the CRT during the time of the next 3-slot segment.

Although the display character has been referred to as a 48-bit signal, in general only 35 elements need be controlled permutatively. Thus, the character generator and strobe read-out advantageously includes a set of 35 two-input AND-gates corresponding to the 35 possible dot positions on the CRT. The outputs of these gates are OR'd together to provide a composite output. One output of each AND-gate is a unique strobe pulse, of which there are likewise a set of 35 occurring sequentially at proper time intervals. The second input of each AND-gate is the signal that a particular dot position is required by the character which is to be displayed. Only the common video output and strobe gates need operate at the higher frequency.

POSITIONING OF SMALL NUMERALS

The apparatus also includes means to control the positioning of the small 4 x 5 matrix characters, depending upon whether these characters are to appear as fraction numerators, fraction denominators, decimals, etc. This positioning is controlled by a data bit which is stored in the 3rd bin of one of the delay line slots, and identified in FIGURES 10A, 10B and 10C as $D_{10}$, $P_{D8}$ and $D_2$. The presence of a marked data bit in any of these bins is sensed by a detector generally indicated at 190, and which receives its input from stage 155 of the storage register 154.

If the $D_{10}$ bit of the 3rd position in any line is marked, indicating that the stock is trading in sixteenths or thirty-seconds, this fact will be detected by a flop 192 which is gated during the time each 3rd character enters the register 154, i.e. the data from delay line positions 2–3, 3–3 or 4–3. The resultant setting of this flop activates a lead 194 which controls gate 174 so as to block its input lead 172 (used for large display symbols) and opens another input lead 196 which is connected to data lead 172 through a 10-bit delay chain 198 synchronized by master clock lead 168.

Thus, the 48 bit serial code signal corresponding to the delay line character in register 154 will be delayed by 10 bits in being transmitted to its CRT display. It will be seen that this delay in effect shifts the small 4 x 5 matrix numeral from its normal position in the lower left-hand corner of the large 5 x 7 character area to the upper right-hand corner of this area, e.g. as shown in FIGURE 2 at line 3, position 3 of the CRT display.

Flop 192 forms part of what is in effect a shift register and, when the timing signal for the next character occurs, flop 192 sets another flop 200 and at the same time resets itself. Setting of flop 200 activates a lead 202 which closes gate 174 to lead 196 and opens this gate to another lead 204. This latter lead connects to the second stage of the chain 198, so that the 48 bit character it supplies to gate 174 will be delayed by 2-bits. This 2-bit delay, in turn, positions the small numeral (corresponding to delay line character #4 in the upper left-hand corner of the 5 x 7 matrix area, e.g. as is the numeral "3" in position 4 of line 3 in FIGURE 2.

At the time of the next character, flop 200 resets itself, sets another flop 206, and activates a fraction-bar generator 208. This latter circuit includes means for feeding to gate 174 a signal serving to mark the first seven spots of the first vertical sweep of the next character (in this case, position #5). This defines the fraction bar separating the numerator and denominator. Flop 206 activates a lead 210 which controls gate 174 so as to supply thereto the 48 bit character signal arriving over lead 212 from the 8th stage of the chain 198. Thus, with an 8-bit delay, the small numeric symbol in position #5 is shifted over to the right a distance of one vertical sweep so that the symbol occupies the lower right-hand corner of the large 5 x 7 matrix area.

When the next delay line character (#6) is stepped into register 154, the flop 206 resets, and therefore the gate 174 is receptive to data straight from the basic data lead 172, i.e. without any delay. Thus, this 6th small numeric symbol is placed in its normal location in the lower left-hand corner of the larger 5 x 7 matrix area, e.g. as shown in FIGURE 2 at position 6 of line 3. It should also be noted that the numerals in positions 5 and 6 will be either 16 or 32, depending upon whether the stock is trading in fractional sixteenths or thirty-seconds, as previously described.

If the $P_{D8}$ bit of the 4th character position of any CRT line is marked, indicating a double decimal reply, this face will be detected by a flop 214 connected to stage 155 of register 154. No action is taken at this itme by flop 214, but on the next character time this flop resets itself and simultaneously sets flop 206. As noted hereinabove, this positions the small 4 x 5 numeric symbol in the lower right-hand corner of the larger 5 x 7 matrix area in position #5 of the CRT, e.g. as shown in line 5 of the FIGURE 2 display. The next small character (for position #6) is not delayed, and therefore is placed in the lower left-hand corner immediately next to (but separated by one vertical stroke) the small numeric in position #5. This arrangement indicates to the viewer that the numbers in positions 5 and 6 are to be treated as decimals, i.e. tenths and hundredths.

If the $D_2$ bit of the 5th character position of any line 2 through 4 is marked, indicating a reply in fractional eighths, this is detected by flop 200 the setting of which operates, in the manner previously described, to insert a fraction bar between the 5th and 6th positions in the CRT display, and also to delay the 48 bit serial code signal for position #5 by two bits. This delay shifts the small numeric character to the upper left-hand position, i.e. as in line 2 of FIGURE 2. Flop 206 then is set for the next symbol (a small "*"), and the resultant 8-bit delay positions this symbol in the lower right-hand corner of the 5 x 7 matrix area, e.g. as shown in position #6, line 2, of FIGURE 2.

It is evident that different permutation codes can be used for the various communication requirements outlined above. However, to give an example of a preferred arrangement, there is reproduced hereinbelow in Tables I, II and III code configurations which have been found to be especially advantageous.

TABLE I

COMMUNICATION CODES

QUERY

| 1 2 3 4 5 | Ident |
|---|---|
| 0 0 0 0 0 | Blank |
| 0 0 0 0 1 | A |
| 0 0 0 1 0 | B |
| 0 0 0 1 1 | C |
| 0 0 1 0 0 | D |
| 0 0 1 0 1 | E |
| 0 0 1 1 0 | F |
| 0 0 1 1 1 | G |
| 0 1 0 0 0 | H |
| 0 1 0 0 1 | I |
| 0 1 0 1 0 | S |
| 0 1 0 1 1 | T |
| 0 1 1 0 0 | U |
| 0 1 1 0 1 | V |
| 0 1 1 1 0 | Preferred (+) |
| 0 1 1 1 1 | . (Period) |
| 1 0 0 0 0 | |
| 1 0 0 0 1 | J |
| 1 0 0 1 0 | K |
| 1 0 0 1 1 | L |
| 1 0 1 0 0 | M |
| 1 0 1 0 1 | N |
| 1 0 1 1 0 | O |
| 1 0 1 1 1 | P |
| 1 1 0 0 0 | Q |
| 1 1 0 0 1 | R |
| 1 1 0 1 0 | W |
| 1 1 0 1 1 | X |
| 1 1 1 0 0 | Y |
| 1 1 1 0 1 | Z |
| 1 1 1 1 0 | (11) |
| 1 1 1 1 1 | SOM |

TABLE II

COMMUNICATION CODES

REPLY

| 1 2 3 4 5 | | Data | Indicator |
|---|---|---|---|
| 0 0 0 0 0 | | Blank | |
| 0 0 0 0 1 | | 1 | Four Full Characters |
| 0 0 0 1 0 | | 2 | Alphabetics |
| 0 0 0 1 1 | | 3 | |
| 0 0 1 0 0 | | 4 | 2 Decimal places |
| 0 0 1 0 1 | | 5 | 2 Decimal places and + |
| 0 0 1 1 0 | | 6 | 2 Decimal places and − |
| 0 0 1 1 1 | | 7 | |
| 0 1 0 0 0 | | 8 | * 8ths |
| 0 1 0 0 1 | | 9 | |
| 0 1 0 1 0 | | + | |
| 0 1 0 1 1 | | 0 | |
| 0 1 1 0 0 | | − | 16ths or 32nds |
| 0 1 1 0 1 | | N+ | 16ths |
| 0 1 1 1 0 | | N | 32nds |
| 0 1 1 1 1 | | N− | |
| 1 0 0 0 0 | SOP, EOM | | |
| 1 0 0 0 1 | | | |
| 1 0 0 1 0 | | | |
| 1 0 0 1 1 | | | |
| 1 0 1 0 0 | | | |
| 1 0 1 0 1 | | | |
| 1 0 1 1 0 | | | |
| 1 0 1 1 1 | | | |
| 1 1 0 0 0 | | | |
| 1 1 0 0 1 | | | |
| 1 1 0 1 0 | | | |
| 1 1 0 1 1 | | | |
| 1 1 1 0 0 | | | |
| 1 1 1 0 1 | | | |
| 1 1 1 1 0 | | | |
| 1 1 1 1 1 | SOM | | |

*XF—Fractional Number 4 x 5 Matrix.

TABLE III

RQT TRANSLATOR/GENERATOR CODES

| | Figures 1 2 3 4 5 6 | | Letters 1 2 3 4 5 6 |
|---|---|---|---|
| Num Blk | 0 0 0 0 0 0 | BLK | 0 0 0 0 0 1 |
| 1 | 0 0 0 0 1 0 | A | 0 0 0 0 1 1 |
| 2 | 0 0 0 1 0 0 | B | 0 0 0 1 0 1 |
| 3 | 0 0 0 1 1 0 | C | 0 0 0 1 1 1 |
| 4 | 0 0 1 0 0 0 | D | 0 0 1 0 0 1 |
| 5 | 0 0 1 0 1 0 | E | 0 0 1 0 1 1 |
| 6 | 0 0 1 1 0 0 | F | 0 0 1 1 0 1 |
| 7 | 0 0 1 1 1 0 | G | 0 0 1 1 1 1 |
| 8 | 0 1 0 0 0 0 | H | 0 1 0 0 0 1 |
| 9 | 0 1 0 0 1 0 | I | 0 1 0 0 1 1 |
| + | 0 1 0 1 0 0 | S | 0 1 0 1 0 1 |
| Num 0 | 0 1 0 1 1 0 | T | 0 1 0 1 1 1 |
| − | 0 1 1 0 0 0 | U | 0 1 1 0 0 1 |
| N+) | 0 1 1 0 1 0 | V | 0 1 1 0 1 1 |
| N) | 0 1 1 1 0 0 | (+) | 0 1 1 1 0 1 |
| N−) | 0 1 1 1 1 0 | . | 0 1 1 1 1 1 |
| F Blank | 1 0 0 0 0 0 | | 1 0 0 0 0 1 |
| 1F | 1 0 0 0 1 0 | J | 1 0 0 0 1 1 |
| 2F | 1 0 0 1 0 0 | K | 1 0 0 1 0 1 |
| 3F | 1 0 0 1 1 0 | L | 1 0 0 1 1 1 |
| 4F | 1 0 1 0 0 0 | M | 1 0 1 0 0 1 |
| 5F | 1 0 1 0 1 0 | N | 1 0 1 0 1 1 |
| 6F | 1 0 1 1 0 0 | O | 1 0 1 1 0 1 |
| 7F | 1 0 1 1 1 0 | P | 1 0 1 1 1 1 |
| 8F | 1 1 0 0 0 0 | Q | 1 1 0 0 0 1 |
| 9F | 1 1 0 0 1 0 | R | 1 1 0 0 1 1 |
| | 1 1 0 1 0 0 | W | 1 1 0 1 0 1 |
| Fraction 0 | 1 1 0 1 1 0 | X | 1 1 0 1 1 1 |
| | 1 1 1 0 0 0 | Y | 1 1 1 0 0 1 |
| | 1 1 1 0 1 0 | Z | 1 1 1 0 1 1 |
| | 1 1 1 1 0 0 | (11) | 1 1 1 1 0 1 |
| | 1 1 1 1 1 0 | | 1 1 1 1 1 1 |

As shown in FIGURES 10A, 10B and 10C, the first bin of each delay line slot is labeled "P." This represents a control bit position which is not directly involved with the operation of the CRT display system described herein, and for that reason no description of its functioning is included.

Although a specific preferred embodiment of the invention has been set forth in detail, it is desired to emphasize that this is not intended to be exhaustive or necessarily limitative; on the contrary, the showing herein is for the purpose of illustrating the invention and thus enable others skilled in the art to adapt the invention in such ways as meet the requirements of particular applications, it being understood that various modifications may be made without departing from the scope of the invention as limited by the prior art.

We claim:

1. In a query and reply system, a central station including data storage and data processing means;

a plurality of intermediate stations coupled to said central station to send query messages thereto and to receive replies therefrom;

memory means at each of said intermediate stations for storing said query and reply messages;

a plurality of remote stations including data entry means and data presentation means;

circuit means for connecting groups of said remote stations to corresponding intermediate stations;

query sampling means at said intermediate stations operating to scan successively the data entry means of the group of remote stations connected thereto and to store any sampled query signals in said memory means;

polling means at said central station arranged to interrogate each of said intermediate stations in succession to determine whether it contains any stored query message;

means at each intermediate station responsive to an interrogation signal for sending any stored query message to said central station;

said central station being automatically operable to develop and transmit to the intermediate station reply messages corresponding to such query messages;

means at each intermediate station for storing said reply messages in said memory means; and means at each intermediate station for sending to its associated remote stations in succession signals corresponding to said stored reply messages for display by the data presentation means at the corresponding remote station.

2. In a query and reply system,
a central station including data storage and data processing means;
a plurality of intermediate stations coupled to said central station to send query messages thereto and to receive replies therefrom;
memory means at each of said intermediate stations for storing said query and reply messages;
a plurality of remote stations including data entry means and data presentation means;
circuit means for connecting groups of said remote stations to corresponding intermediate stations;
query sampling means at said intermediate stations operating to scan successively the data entry means of the group of remote stations connected thereto and to store any sampled query signals in said memory means;
polling means at said central station arranged to interrogate each of said intermediate stations in succession to determine whether it contains any stored query message;
seeker means at each intermediate station and responsive to an interrogation signal for scanning successively the query signals stored in the memory means for all of the remote stations associated with the intermediate station;
means responsive to said seeker means for sending any stored complete query message to said central station;
said central station being automatically operable to develop and transmit to the intermediate station reply messages corresponding to such query messages;
means at each intermediate station for storing said reply messages in said memory means; and
means at each intermediate station for sending to its associated remote stations in succession signals corresponding to said stored reply messages for display by the data presentation means at the corresponding remote station.

3. A query and reply system comprising:
a control station including memory means;
a plurality of remote stations operable with said control station;
data entry means at each remote station to send query signals to said control station to be stored in said memory means;
means for identifying selected queries in said memory means as being of a particular class;
data presentation means at each remote station responsive to reply signals from said control station;
data processing means coupled to said control station;
means forming part of said data processing means to send an interrogating signal to said control station for initiating the transmission of a stored query to said data processing means, said interrogating signal having an element indicating a particular class of query to be sent;
means at said control station for transmitting query signals to said data processing means; and
means responsive to said element of said interrogating signal for selecting certain stored queries for transmission to said processing means in accordance with the character of said interrogating signal.

4. A query and reply system comprising:
a plurality of control stations each including memory means;
a plurality of remote stations including groups operable with corresponding control stations;
data entry means at each remote station to send query signals to its control station to be stored in said memory means;
means for identifying selected queries in each memory means as being of a particular class;
data presentation means at each remote station responsive to reply signals from its control station;
data processing means coupled to said control station;
polling means forming part of said data processing means to send interrogating signals to said control stations in succession for initiating the transmission of stored queries to said data processing means, said interrogating signals having a characteristic indicating a particular class of query to be sent during the poll then in process;
means at each control station for transmitting query signals to said data processing means; and
means responsive to said interrogating signal characteristic for selecting certain stored queries for transmission to said data processing means in accordance with said characteristic of said interrogating signal.

5. A query and reply system comprising
a control station including memory means;
a plurality of remote stations operable with said control station;
data entry means at each remote station to send query signals to said control station to be stored in said memory means;
data presentation means at each remote station responsive to reply signals from said control station;
data processing means coupled to said control station;
means forming part of said data processing means to send an interrogating signal to said control station to initiate the transmission of a stored query to said data processing means;
means at said control station responsive to said interrogating signal for transmitting query signals to said data processing means; and
priority means forming part of said signal responsive means and operable to condition said control station selectively in one of two conditions dependent upon the nature of the signal received from said data processing means;
said control station including means effective when in the first of said conditions to send to said data processing means only queries which have not yet been answered and when in the second of said conditions to send to said data processing means all of the stored queries, whether or not they have been answered previously by said data processing means.

6. A query and reply system comprising:
a control station including memory means;
a plurality of remote stations operable with said control station;
data entry means at each remote station to send query signals to said control station to be stored in said memory means in a section thereof assigned to the respective remote station;
data presentation means at each remote station responsive to reply signals from said control station;
data processing means coupled to said control station;
means forming part of said data processing means to send an interrogating signal to said control station to initiate the transmission of a stored query to said data processing means;
seeker means at said control station responsive to said interrogating signal and operable to scan the sections of said memory means in predetermined sequence to determine whether any contains a complete query from its corresponding remote station; and
means to send to said data processing means any stored query which has not been answered previously by said data processing means.

7. A query and reply system comprising:
a control station including recirculating cyclical memory means;
a plurality of remote stations operable with said control station;

data entry means at each remote station to develop query signals to be sent to said control station;

multiplex query sampling means at said control station to scan all of said data entry means in succession to determine whether any has developed a query character;

means at said control station for inserting any detected query character in said memory means in a section thereof assigned to the respective remote station;

data presentation means at each remote station responsive to reply signals from said control station;

data processing means coupled to said control station;

means forming part of said data processing means to send an interrogating signal to said control station to initiate the transmission of a stored query to said data processing means;

seeker means at said control station responsive to said interrogating signal and operable to scan the sections of said memory means in sequence to determine whether any contains a complete assembled query from its corresponding remote station;

means to send such query to said data processing means;

said data processing means being operable to develop and send to said control station a corresponding reply message for storage in said memory means; and means at said control station for transmitting to said remote stations reply signals corresponding to a stored reply message.

8. In a query and reply system including data storage and processing means;

a query and reply station including query entry means and query and reply display means;

said query entry means including a first signal control means for producing identification query signals and second signal control means for producing function query signals;

means coupling said first and second signal control means to said data storage and processing means whereby said query entry signals call forth data reply signals from said data storage and processing means;

coupling means for applying signals representative of said identification query signals, said function query signals, and said reply signals to said display means whereby to display characters corresponding to said identification and function query signals and said reply signals;

said data storage and processing means including operational control means responsive to new function query signals from said query and reply station to clear from said display means said characters corresponding to previous function query signals and reply signals; and said operational control means being responsive to new identification query signals to clear from said display means all of said characters corresponding to previous identification query signals, function query signals and reply query signals.

9. In a query and reply system, a control station including memory means;

a remote station operable with said control station;

data entry means at said remote station for forming query messages composed of identification signals and function signals, and means for transmitting said query messages to said control station to be stored in said memory means;

data presentation means at said remote station responsive to reply signals from said control station to produce display characters representative of said query and reply signals;

data processing means coupled to said control station to receive query messages from said control station and to return reply messages to said control station to be stored in said memory means for transmission to said remote station;

said memory means including delay line storage means and a feedback recirculating loop, said feedback recirculating loop including a normally open gate means for recirculating said query messages, including said identification signals and said function signals, and said reply messages in said delay line storage means;

means responsive to new function signals from said remote station for closing said gate means in said feedback recirculating loop during the recirculation of signals representing the previous function and reply signals associated with said remote station thereby effectively erasing said function and reply signals from said memory means; and means responsive to a new identification signal from said remote station for closing said gate means in said feedback recirculating loop during the recirculation of signals representing the entire previous query and reply messages associated with said remote station thereby effectively erasing said previous messages from said memory means.

10. In a query and reply system, a control station including memory means;

a remote station operable with said control station;

data entry means at said remote station for forming query messages composed of identification signals and function signals, and means for transmitting said query messages to said control station to be stored in said memory means;

data presentation means at said remote station responsive to reply signals from said control station to produce display characters representative of said identification signals, function signals and reply signals;

data processing means coupled to said control station to receive query messages from said control station and to return reply messages to said control station to be stored in said memory means for transmission to said remote station;

said memory means including delay line storage means and a feedback recirculating loop, said feedback recirculating loop including a normally open gate means for recirculating said query messages, including said identification signals and said function signals, and said reply messages in said delay line storage means;

and means responsive to new function signals from said remote station for closing said gate means in said feedback recirculating loop during the recirculation of signals representing the previous function and reply signals associated with said remote station thereby effectively erasing said function and reply signals from said memory means.

11. In a query and reply system, a control station including memory means;

a remote station operable with said control station;

data entry means at said remote station for forming query messages composed of identification signals and function signals, and means for transmitting said query messages to said control station to be stored in said memory means;

data presentation means at said remote station responsive to reply signals from said control station to produce display characters representative of said query messages and said reply signals;

data processing means coupled to said control station to receive query messages from said control station and to return reply messages to said control station to be stored in said memory means for transmission to said remote station;

said memory means including delay line storage means and a feedback recirculating loop, said feedback recirculating loop including a normally open gate means for recirculating said query messages and said reply messages in said delay line storage means; and means responsive to a new identification signal from said remote station for closing said gate means in said feedback recirculating loop during the recirculation of signals representing the entire previous query and reply messages associated with said remote station thereby effectively erasing said previous messages from said memory means.

12. In a query and reply system;

a central station including data storage and data processing means;

an intermediate station;

a transmission line coupling said intermediate station to said central station, said line being adapted to transmit complete query messages from said intermediate station to said central station and to transmit complete reply messages from said central station to said intermediate station;

recirculating cyclical memory means at said intermediate station for storing said query and reply messages;

a plurality of remote stations including data entry means and a cathode ray tube data presentation means;

circuit means connecting said remote stations to said intermediate station;

query sampling means at said intermediate station operating to scan successively the data entry means of all the remote stations connected thereto and to store any sampled query signals in said memory means;

means operative each time a complete query message from a given one of said remote stations has been assembled in said memory means for causing said query message to be transmitted through said line to said central station;

means at said central station for developing a reply message for each query message;

means operative when said central station has developed a complete reply message for transmitting the reply message through said line to said intermediate station;

means at said intermediate station for storing each reply message in said memory means; and means at said intermediate station for continuously sending to the associated remote stations in succession signals corresponding to said stored reply messages for display by the cathode ray tube data presentation means at the corresponding remote station.

13. A system of the type described in claim 12 wherein there are a plurality of said central stations; and including a main data processor having a large capacity storage means on which information to be used in developing reply messages are calculated and recorded; and means for transferring information on said large capacity memory means to the data storage at each central station.

References Cited

UNITED STATES PATENTS

| | | | |
|---|---|---|---|
| 3,344,401 | 9/1967 | MacDonald et al. | 340—152 |
| 3,281,788 | 10/1966 | Hernan et al. | 340—152 |
| 3,296,597 | 1/1967 | Scantlin et al. | 340—152 |
| 3,312,952 | 4/1967 | Scantlin et al. | 340—152 |
| 3,314,051 | 4/1967 | Willcox et al. | 340—152 |
| 3,335,411 | 8/1967 | Sinn | 340—152 |
| 3,307,156 | 2/1967 | Durr | 340—324.1 |

JOHN W. CALDWELL, Primary Examiner

M. M. CURTIS, Assistant Examiner

U.S. Cl. X.R.

178—2, 50; 340—152, 324